(12) United States Patent  
Dong et al.

(10) Patent No.: US 8,705,924 B2  
(45) Date of Patent: Apr. 22, 2014

(54) ULTRA HIGH NUMERICAL APERTURE OPTICAL FIBERS

(75) Inventors: Liang Dong, Clemson, SC (US); Xiang Peng, Orlando, FL (US); Brian K Thomas, Brighton, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 13/610,270

(22) Filed: Sep. 11, 2012

(65) Prior Publication Data

US 2013/0114933 A1     May 9, 2013

Related U.S. Application Data

(60) Continuation of application No. 13/215,585, filed on Aug. 23, 2011, now Pat. No. 8,285,100, which is a continuation of application No. 12/756,138, filed on Apr. 7, 2010, now Pat. No. 8,023,788, which is a continuation of application No. 12/338,565, filed on Dec. 18, 2008, now Pat. No. 7,715,672, which is a division of application No. 11/691,986, filed on Mar. 27, 2007, now Pat. No. 7,496,260.

(51) Int. Cl.
*G02B 6/00*     (2006.01)  
*G02B 6/32*     (2006.01)  
*G02B 6/02*     (2006.01)

(52) U.S. Cl.
USPC ........... 385/125; 385/123; 385/126; 385/141; 385/11

(58) Field of Classification Search
USPC .................... 385/11, 122, 123, 125–128, 141
See application file for complete search history.

(56) References Cited

U.S. PATENT DOCUMENTS

| 5,361,319 | A | 11/1994 | Antos et al. |
| 5,615,673 | A | 4/1997 | Berger et al. |

(Continued)

FOREIGN PATENT DOCUMENTS

| EP | 0905834 | 3/2001 |
| EP | 1421420 | 1/2007 |

(Continued)

OTHER PUBLICATIONS

Mukasa, et al., "Novel Fabrication Method of Highly-Nonlinear Silica Holey Fibers," presented at Conference on Lasers and Electro-Optics, 2006 as paper CMC5.

(Continued)

*Primary Examiner* — Charlie Peng  
*Assistant Examiner* — Mary El Shammaa  
(74) *Attorney, Agent, or Firm* — Knobbe, Martens, Olson & Bear, LLP

(57) ABSTRACT

Various embodiments described include optical fiber designs and fabrication processes for ultra high numerical aperture optical fibers (UHNAF) having a numerical aperture (NA) of about 1. Various embodiments of UHNAF may have an NA greater than about 0.7, greater than about 0.8, greater than about 0.9, or greater than about 0.95. Embodiments of UHNAF may have a small core diameter and may have low transmission loss. Embodiments of UHNAF having a sufficiently small core diameter provide single mode operation. Some embodiments have a low V number, for example, less than 2.4 and large dispersion. Some embodiments of UHNAF have extremely large negative dispersion, for example, less than about −300 ps/nm/km in some embodiments. Systems and apparatus using UHNAF are also disclosed.

31 Claims, 20 Drawing Sheets

(56) References Cited

U.S. PATENT DOCUMENTS

| | | | |
|---|---|---|---|
| 5,802,236 | A | 9/1998 | DiGiovanni et al. |
| 5,907,652 | A | 5/1999 | DiGiovanni et al. |
| 5,949,941 | A | 9/1999 | DiGiovanni |
| 6,072,811 | A | 6/2000 | Fermann |
| 6,334,019 | B1 | 12/2001 | Birks |
| 6,444,133 | B1 | 9/2002 | Fajardo |
| 6,496,301 | B1 | 12/2002 | Koplow |
| 6,597,848 | B1 | 7/2003 | Berkey et al. |
| 6,631,234 | B1 | 10/2003 | Russell et al. |
| 6,792,188 | B2 | 9/2004 | Libori et al. |
| 6,795,635 | B1 | 9/2004 | Fajardo |
| 7,088,756 | B2 | 8/2006 | Fermann et al. |
| 7,113,327 | B2 | 9/2006 | Gu et al. |
| 7,116,875 | B2 | 10/2006 | Wadsworth et al. |
| 7,155,097 | B2 | 12/2006 | Jakobsen et al. |
| 7,190,705 | B2 | 3/2007 | Fermann et al. |
| 7,212,716 | B2 | 5/2007 | Arimondi et al. |
| 7,221,840 | B2 | 5/2007 | Vienne et al. |
| 7,327,922 | B2 | 2/2008 | Skovgaard et al. |
| 7,496,260 | B2 | 2/2009 | Dong et al. |
| 7,526,165 | B2 | 4/2009 | Nielsen et al. |
| 7,539,382 | B2 | 5/2009 | Skovgaard et al. |
| 7,590,323 | B2 | 9/2009 | Broeng et al. |
| 7,715,672 | B2 | 5/2010 | Dong et al. |
| 8,023,788 | B2 | 9/2011 | Dong et al. |
| 8,285,100 | B2 | 10/2012 | Dong et al. |
| 2002/0172486 | A1 | 11/2002 | Fermann et al. |
| 2002/0181534 | A1 | 12/2002 | Hodgson et al. |
| 2003/0165313 | A1 | 9/2003 | Broeng |
| 2003/0169987 | A1 | 9/2003 | Eggleton et al. |
| 2004/0033043 | A1 | 2/2004 | Monro |
| 2004/0071423 | A1 | 4/2004 | Libori |
| 2004/0179796 | A1 | 9/2004 | Jakobsen et al. |
| 2004/0213302 | A1 | 10/2004 | Fermann et al. |
| 2004/0263950 | A1 | 12/2004 | Fermann et al. |
| 2005/0018714 | A1 | 1/2005 | Fermann et al. |
| 2005/0041702 | A1 | 2/2005 | Fermann et al. |
| 2005/0105865 | A1 | 5/2005 | Fermann et al. |
| 2005/0111500 | A1 | 5/2005 | Harter et al. |
| 2005/0157998 | A1 | 7/2005 | Dong |
| 2005/0226278 | A1 | 10/2005 | Gu et al. |
| 2005/0286847 | A1 | 12/2005 | Arimondi et al. |
| 2006/0104582 | A1* | 5/2006 | Frampton et al. ............ 385/123 |
| 2006/0193583 | A1 | 8/2006 | Dong |
| 2006/0263024 | A1 | 11/2006 | Dong |
| 2007/0104436 | A1 | 5/2007 | Li et al. |
| 2007/0163301 | A1 | 7/2007 | Dong et al. |
| 2007/0204656 | A1 | 9/2007 | Gallagher et al. |
| 2008/0310806 | A1 | 12/2008 | Mukasa |
| 2009/0052853 | A1 | 2/2009 | Mukasa et al. |
| 2009/0095023 | A1 | 4/2009 | Dong et al. |
| 2010/0189390 | A1 | 7/2010 | Dong et al. |

FOREIGN PATENT DOCUMENTS

| | | |
|---|---|---|
| JP | 2002-506533 | 2/2002 |
| JP | 2005500583 | 1/2005 |
| JP | 2006317692 | 11/2006 |
| JP | 2006343769 | 12/2006 |
| WO | WO 99/00685 | 1/1999 |
| WO | WO 00/16141 | 3/2000 |
| WO | WO 03/019257 | 3/2003 |
| WO | WO 03/038486 | 5/2003 |
| WO | WO 03/078338 | 9/2003 |
| WO | WO 03/100488 | 12/2003 |
| WO | WO 2005/048417 | 5/2005 |
| WO | WO 2005/059612 | 6/2005 |
| WO | WO 2005/091029 | 9/2005 |

OTHER PUBLICATIONS

Birks, et al., "Optical Micro- and Nano-structures Using Fibre Tapers," in Conference on Lasers and Electro-Optics, pp. 47-49, May 22, 2005.

Kumar, et al., "Tellurite Photonic Crystal Fiber," Optics Express, vol. 11, No. 20, pp. 2641-2645, Oct. 6, 2003.

Kuhlmey, et al., "Multipole method for microstructured optical fibers. II. Implementation and results," Journal of Optical Society of America B, vol. 19, pp. 2331-2340 (2002).

Wadsworth, et al., "Hole Inflation and tapering of Stock Photonic Crystal Fibres," Optics Express, vol. 13, No. 17, p. 6541-6549, Aug. 22, 2005.

White, et al., "Multiple method for microstructured optical fibers. I. Formulation," Journal of Optical Society of America B, vol. 19, pp. 2322-2330 (2002).

S. Yamadori et al., "Numerical Aperture of Multimode Photonic Crystal Fiber," Proceedings of Elect. Society Conference of IEICE, Sep. 10-13, 2002, paper C-3-51.

O. Tohyama et al., "Photonic Crystal Fibers and Their Applications", Institute of Electronics, Information, and Communication Engineers, Technical Report of 18 ICE, OPE2002-11, vol. 102, No. 521, pp. 27-32, Dec. 11, 2002.

Office Action for JP Pat. Appl. No. 2008-077176, dated Apr. 18, 2013, in 10 pages.

Extended European Search Report for EP Pat. Appl. No. 08005594.0, dated Dec. 7, 2012, in 11 pages.

* cited by examiner

ULTRA HIGH NUMERICAL APERTURE OPTICAL FIBERS

CROSS REFERENCE TO RELATED APPLICATIONS

The present application is a continuation of U.S. patent application Ser. No. 13/215,585, filed Aug. 23, 2011, entitled "ULTRA HIGH NUMERICAL APERTURE OPTICAL FIBERS," now U.S. Pat. No. 8,285,100, which is a continuation of U.S. patent application Ser. No. 12/756,138, filed Apr. 7, 2010, entitled "ULTRA HIGH NUMERICAL APERTURE OPTICAL FIBERS," now U.S. Pat. No. 8,023,788, which is a continuation of U.S. patent application Ser. No. 12/338,565, filed Dec. 18, 2008, entitled "ULTRA HIGH NUMERICAL APERTURE OPTICAL FIBERS," now U.S. Pat. No. 7,715,672, which is a divisional of U.S. patent application Ser. No. 11/691,986, filed Mar. 27, 2007, entitled "ULTRA HIGH NUMERICAL APERTURE OPTICAL FIBERS," now U.S. Pat. No. 7,496,260. The entirety of each of the above-referenced applications and patents is hereby incorporated by reference herein.

BACKGROUND

1. Field of the Invention

This application relates to apparatus and methods for optical fibers including, for example, optical fibers having a high numerical aperture.

2. Description of the Related Art

Significant technology developments in the late 1970s reduced optical fiber transmission loss to below 0.2 dB per km. These developments allow transmission of an optical signal over a few hundred kilometers without a repeater to boost signal, which is a significant achievement over electric cables based on metallic conductors. In addition to fiber transmission loss, another important transmission characteristic of an optical fiber is dispersion, which describes wavelength-dependent transmission delays. An optical pulse broadens during transmission in the presence of dispersion. This limits transmission speed as well as distance, because optical pulses will run into each other at the output end of the optical fiber at high transmission speed and long distance. The overlapped optical pulses at the output of the transmission fiber may not be recovered, and the transmitted information will be lost.

Dispersion in an optical fiber has two components: material dispersion and waveguide dispersion. Material dispersion comes from the wavelength-dependent refractive index of the material used to make optical fibers. For example, fibers may be made from a glass such as fused silica, with possible addition of dopants such as germanium, phosphorous, fluorine, and/or boron. Since the glass is mainly silica, material dispersion varies slightly from fiber to fiber. Waveguide dispersion on another hand comes from wavelength-dependent guiding properties of the optical waveguide and can be varied significantly by a waveguide design. Material dispersion and waveguide dispersion can have different arithmetical signs, and they can substantially cancel each other in some fiber embodiments and enhance each other in other embodiments. Standard silica, single-mode fiber has a zero-dispersion wavelength of ~1.3 µm, which is the wavelength at which material and waveguide dispersion cancel each other precisely. An earlier generation of single-mode optical fiber transmission systems is based on operation at a wavelength of ~1.3 µm, which provides low dispersion for high speed and long distance transmission.

Since the minimum transmission loss in silica fiber is at a wavelength of ~1.55 µm, dispersion-shifted optical fibers with a zero-dispersion wavelength of ~1.55 µm were developed in the mid-eighties by varying the waveguide dispersion. In the nineties, wavelength-division multiplexed (WDM) systems were developed to accommodate the rapidly growth of the Internet. In a WDM system, multiple channels located at different wavelengths are transmitted in the same fiber. Hundreds of channels can be used in a WDM system with components at the input and output respectively to multiplex and de-multiplex the large number of channels. In a WDM system, many channels may operate at wavelengths where there is significant dispersion. In addition, it was found that the large number of channels can increase optical intensity in the optical fiber to the point where different channels start to interact through nonlinear effects such as four-wave-mixing (FWM). It was also realized that a certain amount of dispersion can significantly reduce nonlinear effects such as FWM, because different channels can walk off each other in the presence of dispersion. This effectively reduces interaction length.

Thus, many optical fibers are fabricated to have a certain amount of dispersion and a large effective area to reduce nonlinear effects in WDM systems. Systems using such fibers typically use dispersion compensation modules (DCM) at repeaters to compensate for pulse broadening caused by dispersion. A DCM may comprise a few kilometers of dispersion-compensating fiber (DCF), which is an optical fiber designed to have high level of waveguide dispersion with an opposite sign to that of the transmission fiber. However, an additional issue in a WDM system is dispersion slope, which depends on the variation in dispersion with wavelength. A disadvantage of many dispersion-compensating fibers is that it is difficult to design a DCF with a high dispersion and appropriate dispersion slope to fully compensate dispersion for all the WDM channels. This sets a limit on the number of channels that can be used so that the channels at the two edges of the transmission windows do not suffer significant performance degradation due to residue dispersion.

Fiber chirped pulse amplification (FCPA) systems are often used for producing high peak power optical pulses. In an FCPA system, initial low-power optical pulses are stretched in time by a stretcher before amplification. The longer pulses have lower peak power so that the pulses may incur less nonlinear penalty in an optical fiber amplifier. After amplification, the longer pulses are then compressed to produce higher peak power optical pulses in a subsequent compressor. A stretcher may comprise an optical fiber with dispersion. More stretching is desired for higher peak power pulses. Stretching may be quantified by the stretching ratio, which is the ratio of the stretched pulse width of the pulse output from the stretcher compared to the pulse width of the pulse input into the stretcher. This stretching ratio is currently limited by the ability of current stretchers to match precisely the dispersion and dispersion slope of the compressor. A stretcher which can better match the terms of higher order dispersion with that of the compressor can further improve current FCPA systems and produce more compressed pulses.

In addition to dispersion, loss is another important parameter in fibers, specifically in systems having a total loss budget. Designs with reduced or minimum loss penalty are strongly favored.

Thus, what is needed is optical fiber that can provide a desired dispersion and that can also provide a suitable dispersion slope at a small optical loss. The present disclosure describes apparatus and methods providing optical fibers that can be used in applications such as described above as well as in other applications.

SUMMARY OF CERTAIN EMBODIMENTS

Various embodiments described herein include optical fiber designs and fabrication processes for fibers that have a higher numerical aperture and a small core size such that dispersion is pronounced. This dispersion may, for example, be two or three orders of magnitude larger than material dispersion in some embodiments.

The numerical aperture can be determined by the refractive index of the core and cladding materials. Various embodiments described herein include designs that provide high numerical index suitable for also yielding high dispersion.

In some embodiments, high dispersion can be provided at relatively small V values. In various embodiments, high numerical aperture produces increased waveguiding that enables operation at small V values with sufficiently strong waveguiding to yield low transmission loss. As described herein, the desired dispersion characteristics may also result.

In various embodiments, high numerical aperture also enables low loss single mode operation at very small core size in certain embodiments. Single mode operation in a step-index optical fiber may be characterized by normalized frequency $V=k\rho NA<2.405$, where k is vacuum wave vector, $\rho$ is the core radius, and NA is the numerical aperture. The vacuum wave vector is related to the vacuum wavelength of light by $k=2\pi/\lambda$. For a fixed value of the normalized frequency V, for example, higher NA permits use of a small core radius $\rho$.

This small core size is associated with a small mode size measured, for example, by a modal field diameter (MFD) characterization system. The small core size may increase optical intensity in the core and consequently may lead to an increase of nonlinear effects, which may be advantageous for applications requiring high levels of nonlinear effects.

Various embodiments described herein, for example, include optical fiber designs and related fabrication processes for ultra high numerical aperture optical fibers (UHNAF) having a numerical aperture (NA) of about 1. Various embodiments of UHNAF may have an NA greater than about 0.7, greater than about 0.8, greater than about 0.9, or greater than about 0.95. Embodiments of UHNAF may have a small core diameter and may have low transmission loss. Embodiments of UHNAF having a sufficiently small core diameter provide single mode operation. Some embodiments of UHNAF have extremely large negative dispersion, for example, less (e.g., more negative) than about −300 ps/nm/km in one embodiment.

Various embodiments disclosed herein include fabrication methods for a UHNAF with numerical aperture close to 1. Methods for splicing a UHNAF to a conventional optical fiber are provided. In some embodiments, UHNAF may be spliced to a conventional fiber with a modal field diameter (MFD) up to about 10 μm with reduced insertion loss.

Embodiments of UHNAF may be advantageously used in a variety of systems and applications. For example, UHNAF having low optical loss and high dispersion may be used in a dispersion compensation module (DCM). The high dispersion substantially reduces the length of fiber thereby providing more compact DCM with lower insertions loss. Various embodiments of UHNAF described herein enable highly nonlinear fibers (HNLF) with small MFD and low loss, which may reduce the threshold of nonlinear devices and enable a wider range of devices based on nonlinear effects.

In various embodiments, low loss may be provided by the small core. For example, embodiments of UHNAF in which the core diameter is smaller than the wavelength of light may enable low optical loss operation. In UHNAF with small cores, the guided optical mode may have substantial optical power outside the core. Less optical loss is present as less light is propagated in the core material that introduces the loss. Optical sensors comprising such UHNAF may also provide substantially strong and long interaction of the probing optical energy with a material disposed outside the core (e.g., in a cladding).

Embodiments of ultra high numerical aperture fiber, which provide increased waveguiding, also allow fibers to operate at very small bend radius without significant bend losses. Such UHNAF embodiments can be used to wire homes and offices in order to provide high capacity network and internet connectivity as well as for compact fiber devices.

Optical fiber amplifiers comprising ultra high numerical aperture fiber and resultant reduced mode field diameter can provide enhanced pump intensity, leading to significantly higher gain per unit of pump power in the optical fiber amplifier. Use of UHNAF may advantageously reduce the cost of fiber amplifiers. Many other applications and implementations of UHNAF are possible.

A wide variety of embodiments are described herein. One embodiment of the invention, for example, comprises an optical fiber capable of propagating light having a wavelength. The fiber comprises a core, an air cladding surrounding the core, the air cladding comprising an air gap having a width, an outer layer surrounding the air cladding; and a plurality of webs mechanically coupling the core and the outer layer such that the air gap is disposed therebetween. The fiber has (i) a numerical aperture greater than about 0.8, and (ii) a loss less than about 10 dB/km.

Another embodiment of the invention also comprises an optical fiber capable of propagating light having a wavelength. The fiber comprises a core having a diameter, a first cladding surrounding the core, the first cladding comprising a gap having a width, an outer layer surrounding the first cladding, and a plurality of webs mechanically coupling the core and the outer layer. The core diameter is less than about 3 micrometers, and the fiber has a loss less than about 10 dB/km.

Another embodiment of the invention comprises a method that includes providing a preform assembly comprising an outer tube having a passage extending at least partially therethrough and one or more hollow inner tubes at least partly within the passage. The hollow inner tubes having hollow regions therein. The method further comprises expanding the hollow inner tubes.

BRIEF DESCRIPTION OF THE DRAWINGS

Certain preferred embodiments of the disclosed inventions will now be described with reference to the following drawings, which are intended for illustrative purposes only.

DETAILED DESCRIPTION OF PREFERRED EMBODIMENTS

Figure 1A:
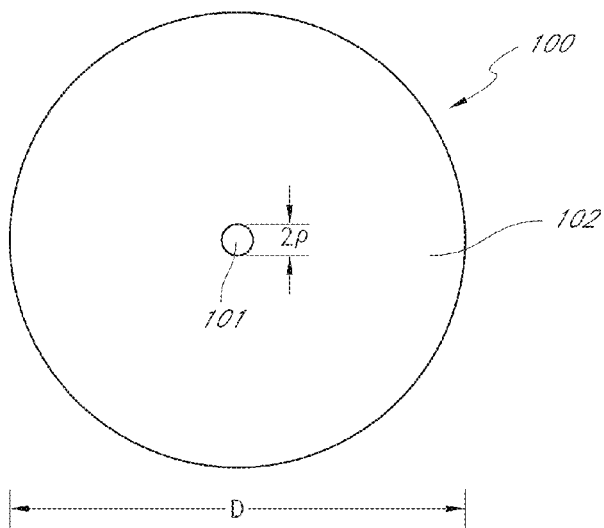
FIG. 1A is a cross-section view schematically illustrating a conventional optical fiber comprising a core with diameter 2ρ and a cladding with diameter D.

A cross-section of one type of conventional optical fiber 100 is schematically illustrated in FIG. 1A. The fiber 100 comprises a core 101 and a cladding 102. The fiber 100 may be further covered and/or coated with protective coatings, which are not illustrated in FIG. 1A. Optical characteristics of conventional optical fibers are mostly determined by two parameters, numerical aperture (NA), and core diameter $2\rho$. Numerical aperture may be defined as $NA=(n_{co}^2-n_{cl}^2)^{1/2}$, when $n_{co}^2-n_{cl}^2<1$, and $NA=1$, when $n_{co}^2-n_{cl}^2\geq1$, where $n_{co}$ and $n_{cl}$ are the refractive index of the core 101 and the cladding 102, respectively. Two further dependent parameters are also useful in describing optical characteristics of the optical fiber 100: relative refractive index $\Delta=(n_{co}-n_{cl})/n_{cl}$ and normalized frequency $V=2\pi\rho NA/\lambda$, where $\lambda$, is the vacuum wavelength of light. FIG. 1A depicts the diameter D of the optical fiber 100.

For a step index fiber, the fiber 100 supports only one mode when V is less than 2.405, which is referred to as the single mode operation regime. For a fixed value of the normalized frequency V, a higher NA permits use of a small core radius $\rho$. Many fibers are operated in the single mode regime in which the normalized frequency is in a range from about 1.4 to about 2.4. Transmission loss of the conventional optical fiber 100 is dominated by Rayleigh scattering at shorter wavelengths and by a phonon absorption band located in the infrared.

Figure 1B:
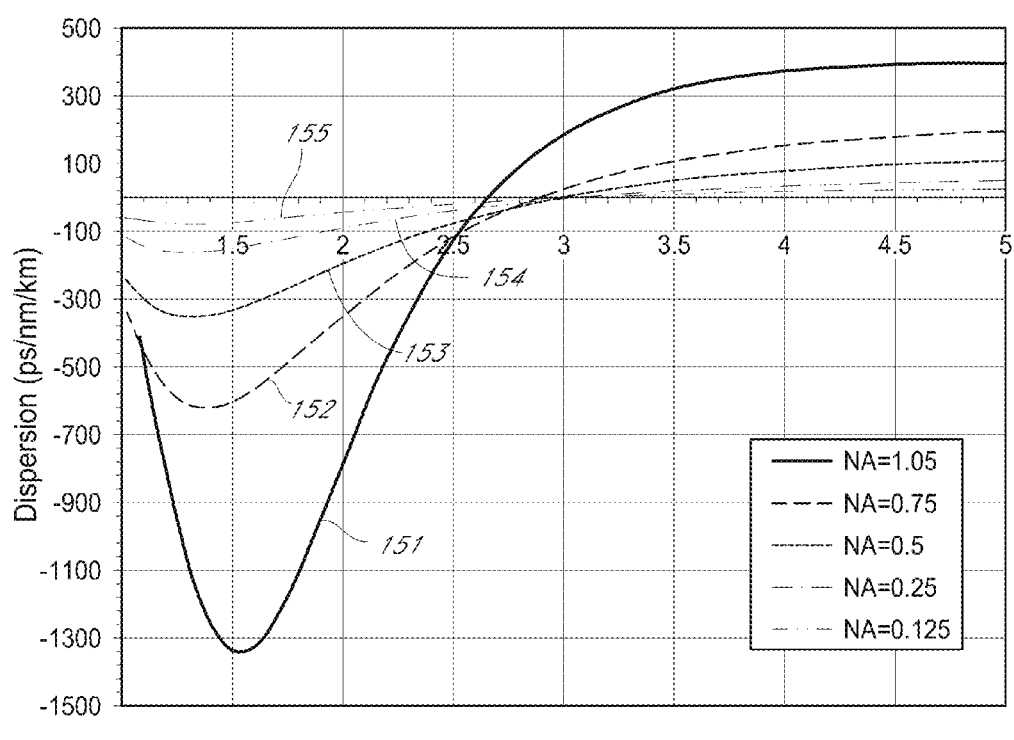
FIG. 1B is a graph showing results of a simulation of dispersion versus normalized frequency V for various step index fibers with different numerical aperture.

FIG. 1B is a graph illustrating results of a simulation of dispersion versus normalized frequency in conventional step index optical fibers having different values of numerical aperture. Curves 151-155 show dispersion results for fibers with numerical apertures of 1.0, 0.75, 0.5, 0.25, and 0.125, respectively. It can be clearly seen from FIG. 1B that in the single mode regime where V<2.405, fibers with higher numerical aperture have larger values of negative dispersion (e.g., more negative) as well as higher dispersion slope (e.g., variation of dispersion with wavelength).

Advantageously, providing a higher NA can enable a smaller core radius and small modal field diameter (MFD) while preserving single mode operation. In the regime where the fiber 100 has a high numerical aperture and a relatively small V value (V<2.3), very high dispersion can be achieved. Additionally, higher numerical aperture may be advantageous for highly nonlinear fibers, which also have a small modal field diameter. In addition, it is easy to fabricate highly polarization-maintaining optical fibers and polarizing optical fibers with high numerical aperture.

Figure 2:
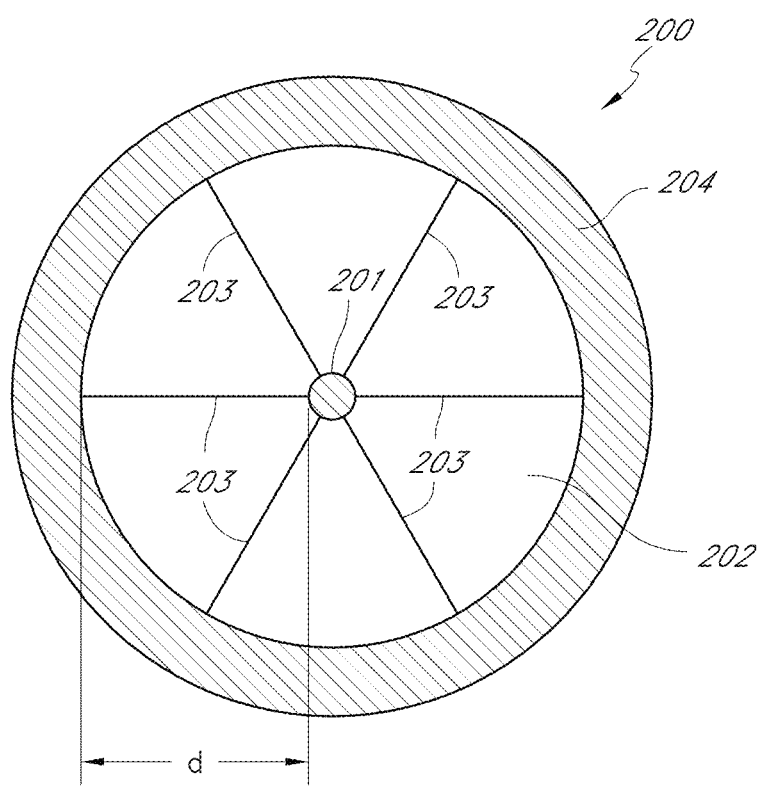
FIG. 2 is a cross-section view schematically illustrating an embodiment of an ultra high numerical aperture optical fiber (UHNAF) comprising a core, webs, first (air) cladding (having width d), and second cladding.

FIG. 2 is a cross-section that schematically illustrates an embodiment of an optical fiber 200 comprising a core 201, a first (e.g., air) cladding 202, six webs 203, and an outer layer comprising a second cladding 204. The optical fiber 200 may be described as having an ultra-high numerical aperture, because certain embodiments of the fiber 200 can have numerical apertures substantially larger than the numerical aperture of a conventional fiber, such as the fiber 100 shown in FIG. 1A. For example, embodiments of ultra high numerical aperture fiber (UHNAF) may have a numerical aperture of about 1. In various embodiments of the UHNAF 200, the numerical aperture may be greater than about 0.7, greater than about 0.8, greater than about 0.9, or greater than about 0.95.

In some embodiments, because the numerical aperture is large, a small core can be provided in a single mode fiber. This small core may result in higher nonlinearity in certain embodiments. The higher numerical aperture also enables highly dispersive optical fibers in some embodiments. Other advantages may also be obtained. As described below, for example, loss may be reduced with the small core as much of the optical mode extends into a gap (e.g., air gap) between the core 201 and the second cladding 204 and because the light propagates through air, the light does not incur the level of optical loss encountered when light propagates through glass, plastic or other core or cladding materials. Other advantages may be obtained in other embodiments.

In certain embodiments, the core 201 may comprise a glass, e.g., fused silica or fused silica doped with one or a combination of germanium, phosphorous, fluorine, boron, aluminum, titanium, tin, and rare earth elements. In other embodiments, the glass may comprise an oxide glass, a fluoride glass, and/or a chalcogenide glass. The glass may be doped with one or more dopants as described above for fused silica. In one embodiment, the glass comprises tellurite. The first cladding 202 may comprise vacuum, a liquid, and/or a gas. In certain embodiments, the gas is air. In some embodiments, the gas comprises inert gas. The gas may include, for example, one or a combination of nitrogen, helium, and inert gases.

The webs 203 extend between the core 201 and the second cladding 204. In the embodiment shown in FIG. 2, each of the webs 203 extends along a substantially radial direction. In other embodiments the webs 203 may be curved or have other shapes or configurations. The webs 203 may be arranged substantially uniformly in azimuth around the core 201, for example, as shown in FIG. 2. Nonuniform azimuthal arrangements may also be used. Although six webs 203 are shown in FIG. 2, a larger or smaller number of webs 203 can be used in other embodiments. For example, two, three, four, five, seven, eight, nine, or ten webs 203 may be used in various embodiments. In an embodiment, one web is used.

The second cladding 204 may comprise glass, e.g., fused silica. In some embodiments, the glass may comprise an oxide glass, a fluoride glass, and/or a chalcogenide glass. The glass may be doped with one or more dopants as described above for fused silica glass. In one embodiment, the glass comprises tellurite. In other embodiments of the fiber 200, materials other than glass (or doped glass) may be used for the core 201, one or more of the webs 203, the first cladding 202, and/or the second cladding 204. The fiber 200 optionally may be coated or covered (not shown) to reduce damage to and losses from the fiber 200.

In certain embodiments, the second cladding 204 may have a refractive index greater than or equal to the refractive index of the core 201. In certain such embodiments, if the air gap (e.g., the first cladding 202) is sufficiently wide such that the optical mode does not reach the second cladding 204, then the second cladding 204 mainly provides structural support and not optical functionality. In such embodiments, the "second cladding" 204 technically may not be a cladding, FIG. 2 depicts a parameter d, which is defined as the width of the first cladding 202. The width, d, of the first cladding layer is shown in FIG. 2 as the width of the gap or space extending from the outer edge of the core 201 to the inner surface of the second cladding 204. The webs 203 shown in FIG. 2 have a radial length that is approximately equal to d and a transverse (e.g., azimuthal) thickness that is much smaller than d. The thickness of the webs 203 advantageously may be made sufficiently small in order to achieve a sufficiently high value of NA and sufficiently low transmission loss. In some embodiments, the webs 203 have a transverse thickness that is much smaller than a typical wavelength of light propagated in the fiber 200, for example, less than about one tenth of the wavelength. In some embodiments, the thickness of the web 203 is less than about 150 nm. In other embodiments, the thickness can be smaller such as, for example, less than about 100 nm.

Optical performance of the optical fiber 200 can be simulated without considering the impact of the webs 203 on the propagation of light in the fiber 200. In these simulations, the transverse thicknesses of the webs 203 are assumed to be sufficiently thin compared to the wavelength of light so that the webs 203 do not have a significant effect on the optical performance of the fiber 200. If the diameter of the core 201 is very small, a substantial amount of optical energy propagates in the first cladding 202 and extends some distance away from the core 201. Leakage loss due to the interaction of the optical energy and the second cladding 204 is considered in the simulation for various widths of the first cladding 202. The simulation is performed with a mode solver based on a multipole algorithm such as, for example, the algorithm described in "Multipole method for microstructured optical fibers. I. Formulation" by White, et al., Journal of Optical Society of America B, vol. 19, pp. 2322-2330 (2002) and "Multipole method for microstructured optical fibers. II. Implementation and results" by Kuhlmey, et al., Journal of Optical Society of America B, vol. 19, pp. 2331-2340 (2002), the entire disclosure of each of which is hereby incorporated by reference herein. The Maxwell electromagnetic equations governing light propagation in an optical waveguide can be rescaled as long as all dimensional parameters are scaled in the same way. Accordingly, all dimensional parameters are scaled relative to the core diameter $2\rho$.

Figure 3:
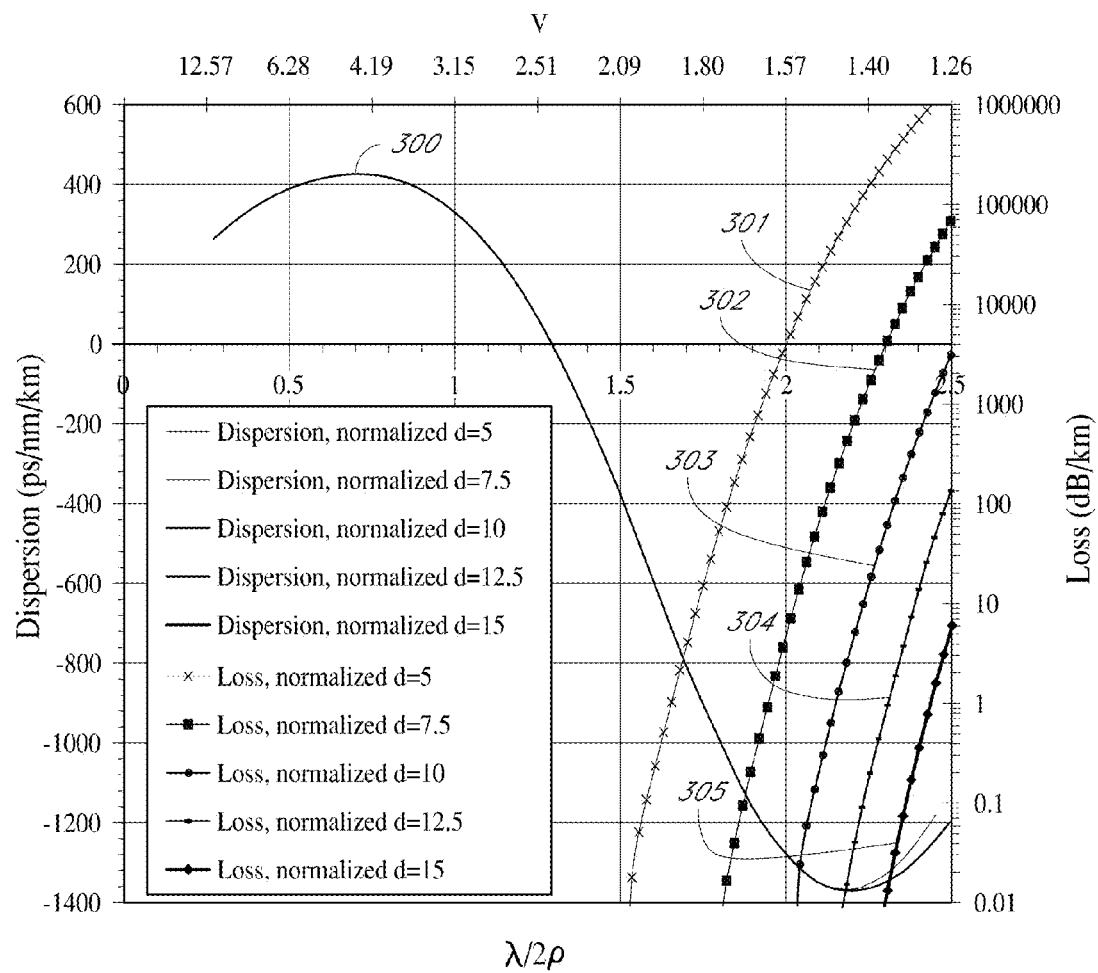
FIG. 3 is a graph showing results of simulations of dispersion (left axis) and leakage loss (right axis) versus normalized wavelength (bottom axis) and normalized frequency (top axis) for ultra high numerical aperture fibers having different air cladding widths, d.

In the following example simulations, the core 201 and the second cladding 204 are assumed to be made of fused silica with a refractive index of 1.45. The first cladding 202 is assumed to be air with a refractive index of 1. These values of the refractive indices yield an NA of 1 for the fiber 200. Optical performance of the fiber 200 is simulated for values of the normalized first cladding width, $d/2\rho$, equal to 5, 7.5, 10, 12.5, and 15. FIG. 3 is a graph that shows simulated dispersion and leakage loss of the fiber 200 versus normalized wavelength $\lambda/2\rho$. The normalized frequency V is indicated at the top of the graph in FIG. 3. Dispersion (measured in units of ps/nm/km) is indicated on the left vertical axis of the graph, and leakage loss (measured in units of dB/km) is indicated on the right vertical axis.

Dispersion changes very little for different values of the first cladding width $d/2\rho$. As can be seen from FIG. 3, individual dispersion curves for each value of $d/2\rho$ overlap into a single curve 300. Dispersion, however, changes noticeably between both positive and negative dispersion with change in core diameter, 2ρ. FIG. 3 shows that there are several regimes in this dispersion curve 300. For relatively large core diameters, λ/2ρ<0.7, the fiber 200 exhibits large positive dispersion with a positive dispersion slope. Around λ/2ρ≈0.7, the fiber 200 exhibits a maximum positive dispersion of about 425 ps/nm/km with very small dispersion slope. For core diameters in a range 0.7<λ/2ρ<1.3, the fiber 200 exhibits a positive dispersion with a negative dispersion slope. Around λ/2ρ≈1.3, the fiber 200 exhibits very small dispersion with a negative dispersion slope. In a range of core diameters where 1.3<λ/2ρ<2.2, the fiber 200 exhibits a negative dispersion with a negative dispersion slope. Around λ/2ρ≈2.2, the fiber 200 exhibits a maximum negative dispersion of about −1371 ps/nm/km and a very low dispersion slope. For relatively small core diameters, λ/2ρ>2.2, the fiber 200 exhibits negative dispersion with a positive dispersion slope.

The normalized frequency value of this embodiment of the fiber 200 is V=π/(λ/2ρ), because NA=1. As discussed above, V is less than 2.405 for single mode operation of the fiber 200, which corresponds to λ/2ρ>1.306. Therefore, embodiments of the UHNAF 200 provide single mode operation if the core 201 has a sufficiently small diameter: 2ρ<0.7655λ. UHNAF 200 with larger diameter cores can provide multimode operation. In the single mode regime, FIG. 3 shows that this embodiment of the ultra high numerical aperture fiber 200 will have negative dispersion. The highest negative dispersion slope of the dispersion curve 300 occurs near λ/2ρ≈1.6, which is in the single mode operating regime.

FIG. 3 shows that leakage loss of the fiber 200 varies significantly with normalized first cladding width d/2ρ. Curves 301, 302, 303, 304, and 305 are simulated leakage losses for fibers 200 having normalized first cladding widths equal to 5, 7.5, 10, 12.5, and 15, respectively. For relatively smaller values of the normalized first cladding width, the leakage loss of the fiber 200 is considerable higher than for relatively larger values of d/2ρ (e.g., the curve 301 lies above the curve 302, which lies above the curve 303, etc.). If a maximum leakage loss of 0.1 dB/km is acceptable in certain applications, embodiments of the fiber 200 can be operated at normalized wavelengths λ/2ρ up to about 1.57, 1.87, 2.07, 2.25, and 2.36 for d/2ρ=5, 7.5, 10, 12.5 and 15, respectively. As described above, a possible explanation for the low leakage loss for large gap or first cladding widths, d, is to reduce modal power tunneling into second cladding 204, which can be subsequently lost to coating materials. For smaller gap or first cladding widths, d, the optical mode interacts more strongly with the second cladding 204, which may lead to increased leakage loss.

Figure 4:
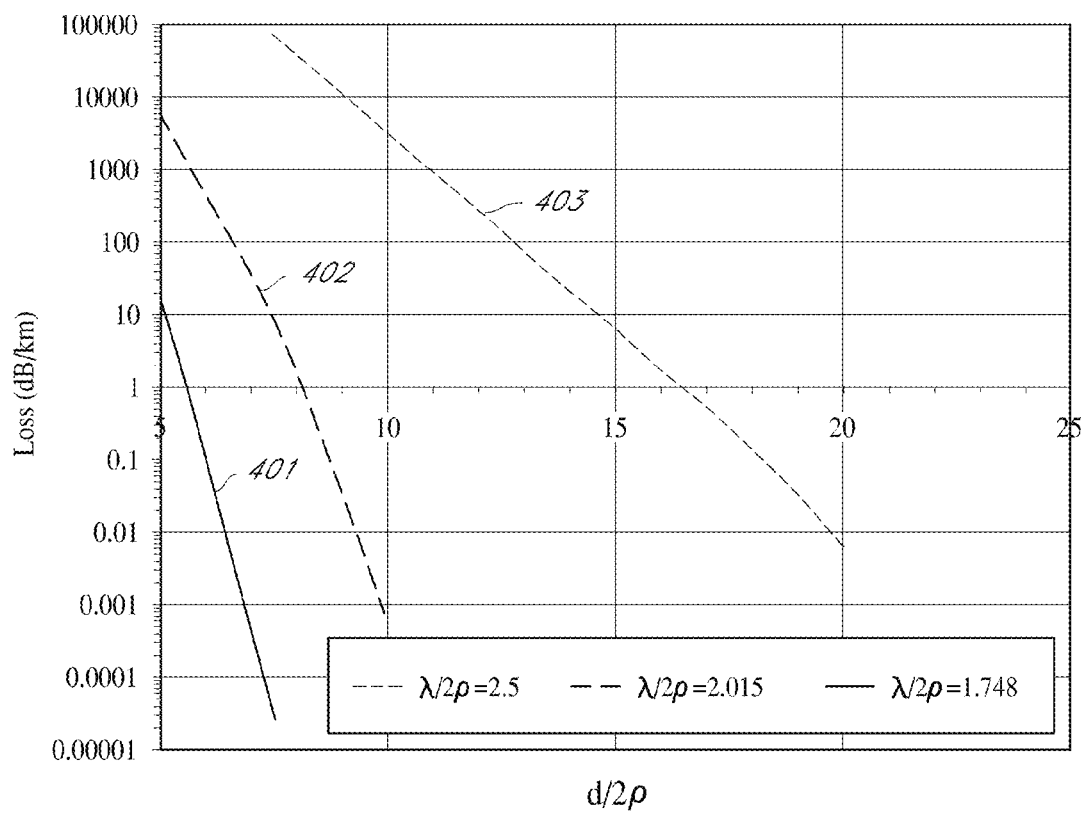
FIG. 4 is a graph showing simulated leakage loss versus normalized first (air) cladding thickness, d, of ultra high numerical aperture fibers.

FIG. 4 also illustrates the dependence of the leakage loss versus normalized first cladding width d/2ρ. Curves 401, 402 and 403 show the leakage loss if the fiber 200 is operated at λ/2ρ=1.748, 2.015, and 2.5, respectively. Each of the curves 401-403 is for single-mode operation of the fiber 200. FIG. 4 shows that leakage loss at a given normalized wavelength λ/2ρ decreases nearly exponentially with an increase of d/2ρ. This strong dependency enables various fibers designed as described herein to advantageously provide substantially reduced optical loss.

Figure 5A:
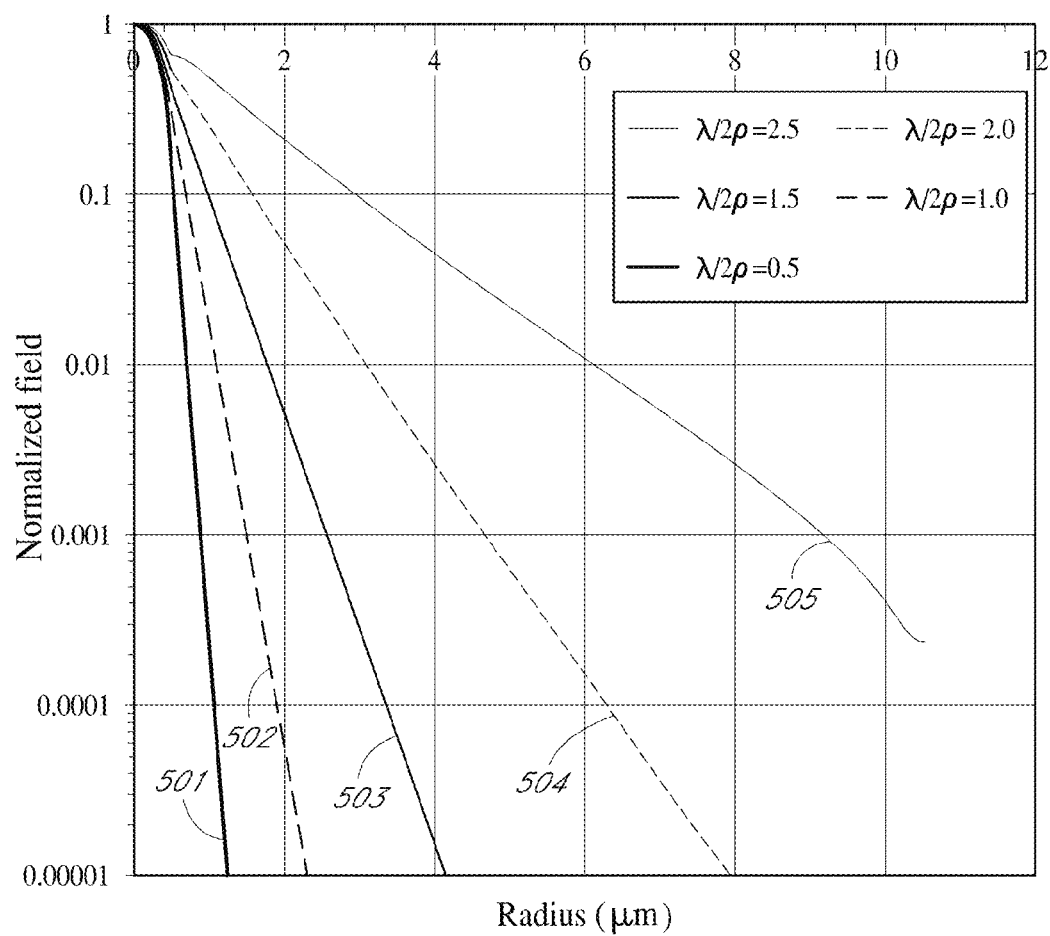
FIG. 5A is a graph showing simulated modal field distribution versus distance from the center of the core at various wavelengths for an example UHNAF.

FIG. 5A shows results of simulations of the normalized electric field distributions of the above-described embodiment of the fiber 200. Curves 501, 502, 503, 504, and 505 show normalized field distribution as a function of radial distance from the center of the fiber 200 for λ/2ρ=0.5, 1.0, 1.5, 2.0, and 2.5, respectively. The curves 501-505 are calculated assuming the core diameter 2ρ=1 μm. FIG. 5A shows that the optical field extends substantially away from the core 201, especially at larger λ/2ρ. As described above, this extended field is advantageous for reducing optical loss as much of the optical mode propagates in air, vacuum, or gas, instead of in glass, plastic, sapphire, or other more lossy material. This extended field is also advantageous for material sensor applications, where strong interaction of the optical field and the material to be sensed is desirable. In certain embodiments, for example, the optical properties of fluid, such as gases or liquids, within the gap may be probed using the light propagating within the optical fiber. Sensors comprising UHNAF are described below in further detail.

Figure 5B:
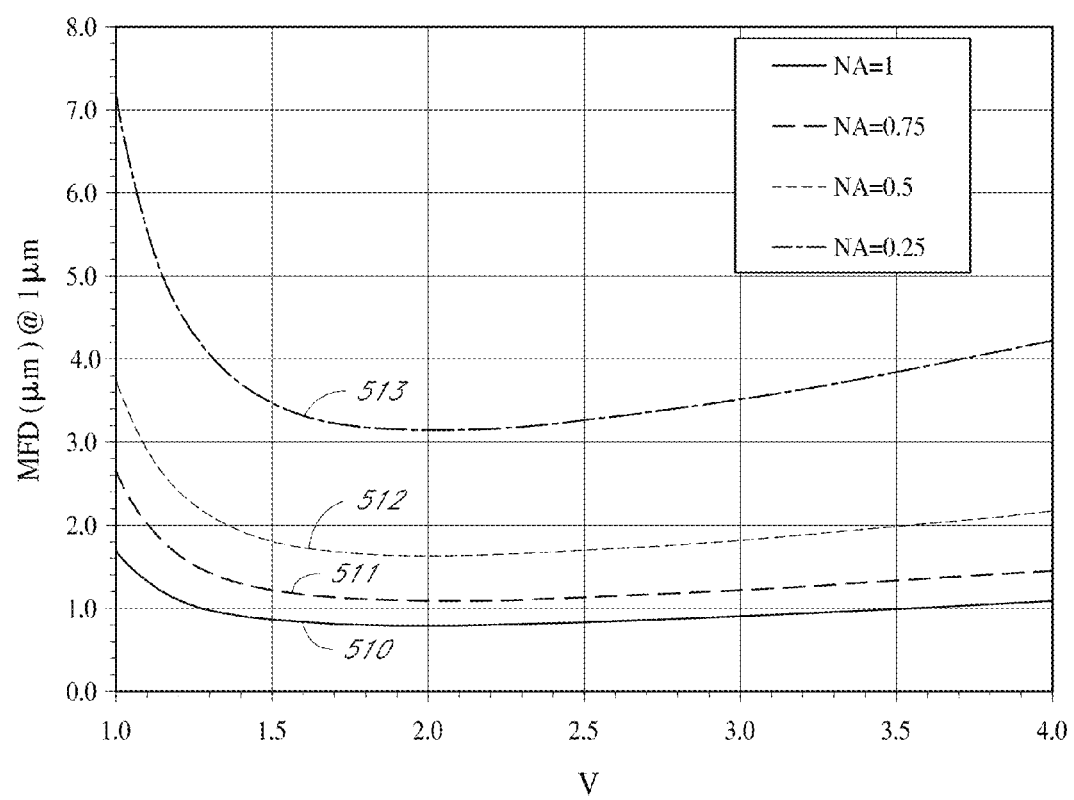
FIG. 5B is a graph showing simulated modal field diameter (MFD) versus normalized frequency V for UHNAFs having different numerical apertures (NA).

FIG. 5B shows simulations of modal field diameter (MFD; measured in micrometers) versus normalized frequency V for the fiber 200 operated at a wavelength of 1 μm. Curves 510, 511, 512, and 513 are simulations for fibers 200 having NA=1, 0.75, 0.5, and 0.25, respectively. FIG. 5B shows that a minimum MFD is reached around V≈2, which is in the single mode operating regime. FIG. 5B also shows that the minimum MFD is smaller for optical fibers having higher numerical aperture.

In various embodiments of UHNAF, core diameters can be in a range from about λ/4 to about 5λ. The width d of the first cladding 202 can range from about ρ to about 50ρ in some embodiments. In certain embodiments of the fiber 200 having smaller core diameter, the width of the first cladding 202 is selected to be sufficiently large to provide low loss and/or large negative dispersion. In certain preferred embodiments of UHNAF, the width of the second cladding 204 is selected to provide sufficient mechanical support for the fiber 200. In other embodiments, other dimensions of the fiber 200 can be used.

Figure 6A:
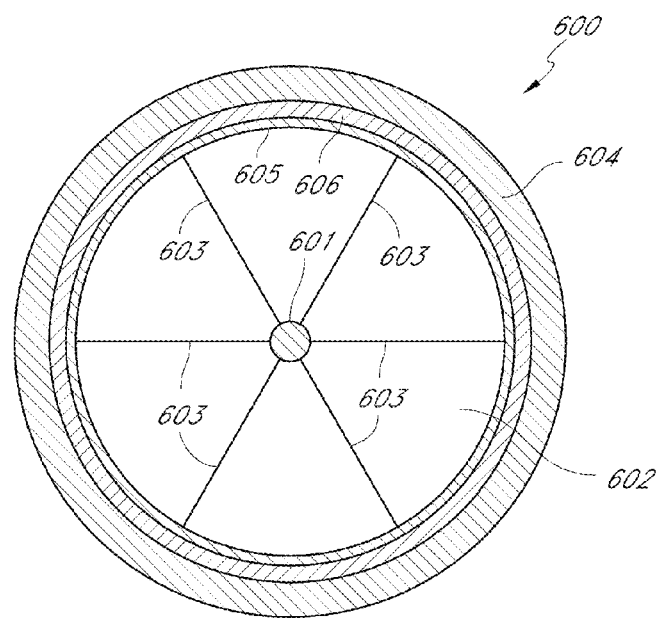
FIG. 6A is a cross-section view schematically illustrating another embodiment of a UHNAF comprising a core, webs, first and second claddings, and first and second additional claddings.

FIG. 6A is a cross-section schematically illustrating another embodiment of an ultra high numerical aperture optical fiber 600. The fiber 600 may advantageously be used to reduce splice loss when spliced to a conventional optical fiber having a larger core diameter. The fiber 600 may be generally similar to the fiber 200 and comprises a core 601, a first cladding 602, webs 603, and a second cladding 604. The optical fiber 600 may have a numerical aperture (NA) of about 1. In various embodiments, the fiber 600 may be configured to have NA>0.7, NA>0.8, NA>0.9, or NA>0.95.

The fiber 600 shown in FIG. 6A also comprises additional claddings 605 and 606. The first additional cladding 605 may comprise a material with a refractive index approximately equal to or slightly less than the refractive index of the core 601. The second additional cladding 606 may comprise a material with a refractive index smaller than that of the first additional cladding 605. In one example of the fiber 600, the core 601 comprises fused silica or fused silica doped with germanium, phosphorous or a mixture of germanium and phosphorous to give it a higher refractive index than that of fused silica. The first cladding layer 602 may comprise vacuum or a gas such as air, nitrogen, argon, and/or other suitable inert gases. The first additional cladding 605 may comprise fused silica or fused silica doped with germanium, phosphorous or a mixture of germanium. The second additional cladding 606 may comprise fused silica doped with fluorine or boron to give it a lower refractive index than fused silica. In other embodiments of the fiber 600, the following dopants or a combination of the following dopants can be used in the core 601 or any part of the claddings 604-606: germanium, phosphorous, boron, fluorine, tin, lead, aluminum, and rare earth ions. The webs 603 may also comprise fused silica with or without the addition of suitable dopants. Although six webs 603 are depicted in FIG. 6A, fewer or greater numbers of webs 603 may be used in other embodiments of the fiber 600. Additionally, as discussed above with reference to FIG. 2, the configuration of the webs 603 may be different than shown in FIG. 6A (e.g., the webs 603 may be curved and/or asymmetrically disposed about the core 601, etc.). In an alternative arrangement, additional claddings 605 and 606 can be omitted. In such cases, the core 601 may be doped to have a higher refractive index than cladding 604.

Figure 6B:
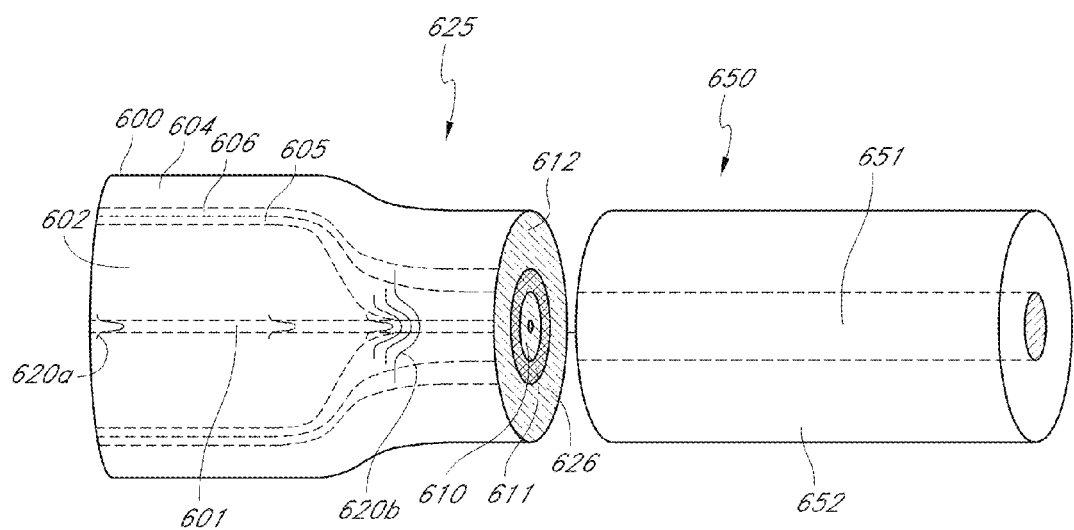
FIG. 6B is a perspective view that schematically illustrates a UHNAF and a conventional optical fiber before splicing, where the UHNAF comprises a transition which may be used for lowering splice loss to the conventional fiber.

FIG. 6B is a perspective view that schematically illustrates the fiber 600 and a conventional optical fiber 650 before splicing. The conventional optical fiber 650 comprises a core 651 and a cladding 652. The conventional fiber 650 may comprise a step-index fiber, a graded-index fiber, or any other suitable optical fiber. The conventional fiber 650 may be generally similar to the fiber 100 shown in FIG. 1A, or it may be any other type of optical fiber. In the embodiment shown in FIG. 6B, the core 651 of the conventional fiber 650 is substantially larger than the core 601 of the fiber 600.

Figure 6C:
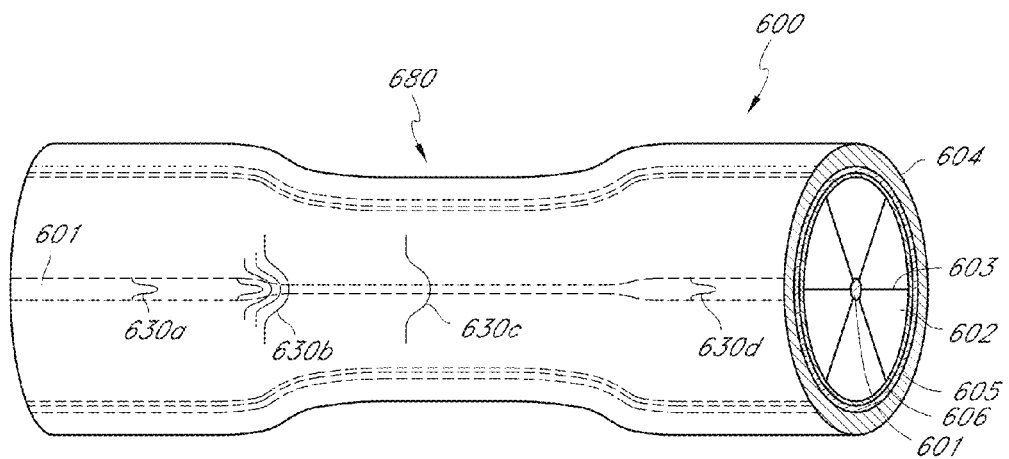
FIG. 6C is a perspective view schematically illustrating a UHNAF that comprises a mode expansion taper.

In one embodiment of a method for splicing the fiber 600 to the fiber 650, a section of the fiber 600 is heated (e.g., by an electric arc) before splicing in order to reduce or substantially eliminate the first cladding 602. After heating, the section may have a reduced cross-sectional area (e.g., as shown in FIGS. 6B and 6C). In some embodiments of this method, the heated section of the fiber 600 fuses, melts, or collapses into a substantially solid structure with substantially total elimination of the air gap or first cladding 602. In certain embodiments, the first cladding 602 is totally eliminated by the heating.

The heated section of the fiber 600 may be cleaved, for example, near the center of the heated and collapsed section of the fiber 600. A portion of the heated section near the cleave 626 comprises a transition 625 schematically illustrated in FIG. 6B. The diameter of the transition 625 may taper from the diameter of the unheated fiber 600 to the diameter of the heated section at the cleave 626. It is advantageous if the diameter of the transition 625 at the cleave 626 is substantially equal to the diameter D of the fiber 650. This is, however, not critical. In embodiments in which the webs 603 have a substantially small cross-sectional area (e.g., due to their relatively small transverse thickness), the contribution of the material in the webs 603 may be neglected in determining the cross-sectional area of the heated section.

In one embodiment of this splicing method, the core 601 of the fiber 600 remains substantially intact during the heating/collapsing process. During heating, the first cladding 602 and first additional claddings 605, second additional cladding 606 and the second cladding 604 are transformed into an outer core 610, a first transition cladding 611, and a second transition cladding 612, respectively.

FIG. 6B schematically illustrates propagation of an optical mode 620a in the fiber 600 and 620b in the transition 625. While propagating in the fiber 600, the mode 620a is confined substantially to the core 601. In the transition 625, the refractive index and diameter of the core 601 may be appropriately chosen so that the core 601 does not form a strongly confining waveguide for the optical mode 620b as the optical mode 620b propagates in the outer core 610 of the transition 625. For example, the transition 625 may be configured so that V<1, in certain embodiments. Instead, the optical mode 620b expands at the transition as schematically depicted in FIG. 6B. Expansion of the mode will cause negligible loss if an adiabatic condition is satisfied along the transition 625, e.g., the transition tapers more slowly than what a local optical mode can follow. For example, in some embodiments, local taper angle of the transition 625 is selected to be less than the local diffraction angle, which may be very large for confined modes. Accordingly, the adiabatic condition is relatively easy to satisfy in such embodiments, and a wide range of tapers may be used. In the transition 625, the optical power of the mode 620b is substantially guided in the core 610, which is substantially surrounded by the first transition cladding 611. The diameters of the core 601 and the first additional cladding 605 of the fiber 600 may be chosen so that the mode field diameter (MFD) in the outer core 610 of the transition 625 is approximately equal to the MFD of the conventional optical fiber 650. The above-described method advantageously permits a low loss splice to be performed between the transition 625 at the cleave 626 and the conventional optical fiber 650, due to the substantially close match of the mode field diameters.

In another embodiment schematically illustrated in FIG. 6C, a portion 680 of the fiber 600 may be tapered to have a smaller diameter. A guided mode 630a propagating toward the tapered portion 680 expands (as schematically depicted at 630b) into an expanded mode 630c that propagates in the tapered portion 680. The expanded mode 630c contracts into a guided mode 630d as it propagates out of the tapered portion 680. In order to avoid significant optical losses, the diameter of the tapered portion 680 may be configured to change according to an adiabatic condition, as described above. In some applications, the tapered portion 680 is heated and collapsed substantially as described above, before spicing to a conventional fiber 650. Also, the fiber 200 described with reference to FIG. 2 that does not include the additional cladding layers 605, 606 can be tapered and/or collapsed in order to expand its guided mode. The tapered section of the fiber 200 may be heated, collapsed, and cleaved before splicing to a conventional optical fiber. In applications where the tapered portion 680 is substantially collapsed, the core 201, 601 may have a higher refractive index than the immediate cladding in the collapsed section (e.g., cladding 605), which can be achieved by, e.g., doping the core material. For example, a core comprising silica may be doped with one or a combination of germanium, phosphorus, tin, etc. In such cases, the collapsed diameter of the core along length of the fiber will expand the mode diameter of the fiber, as fiber goes from high NA in the un-collapsed fiber to a much lower NA fiber of the collapsed section. This expansion of the mode diameter may be present even when the change in core diameter is not substantial, as illustrated in FIG. 5B. If only part of the core is doped to raise the refractive index of the core, the reduction of core diameter in the collapsed part can further expand the optical mode in the collapsed part. This mode expansion can also be achieved with tapering. Tailoring of the core diameter at the collapsed and/or tapered section can be used to match the optical mode diameter in fiber 650 to reduce splice loss. One more method to vary the optical mode diameter at the collapsed and/or tapered section is by varying the refractive index of the doped part of the core. This variation in refractive index will effectively vary the NA of the fiber at the collapsed and/or tapered section. This approach can also be used to match optical mode diameter to fiber 650. The fiber at the collapsed and/or tapered section is then cleaved and spliced to fiber 650.

In other embodiments of the splicing method described above, the fiber 600 or the fiber 200 may be spliced (or otherwise optically coupled) to any other type of fiber, including the fibers 200, 600, dual-clad or multiple-clad fibers, polarization-maintaining fibers, single- or multi-mode fibers, photonic crystal fibers, etc.

Fabrication methods will now be described for making preforms for the ultra high numerical aperture fibers described herein. In various embodiments, the fabrication methods may include one or more processing steps (which may be repeated) described with reference to FIGS. 7-14. In some embodiments of the fabrication methods, additional processing techniques known in the art are included.

Figure 7:
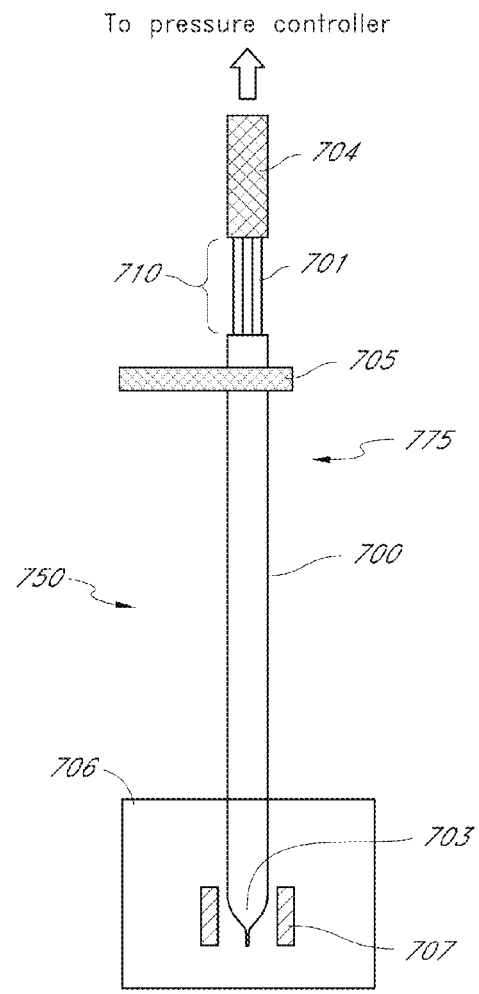
FIG. 7 schematically illustrates a portion of a preform fabrication apparatus used in fabricating a preform for a UHNAF.

FIG. 7 schematically illustrates a portion of a preform fabrication apparatus 750. The apparatus 750 comprises a preform chuck 705 that holds a tube assembly 775 such that a portion of the tube assembly 775 is disposed in a furnace 706. The furnace 706 comprises heating elements 707, which are configured to provide a precise, controlled temperature to the portion of the tube assembly 775 within the hot zone of the furnace 706. The preform chuck 705 is configured to move the tube assembly 775 through the furnace 706. In an initial phase of the fabrication process shown in FIG. 7, an end 703 of the tube assembly 775 is disposed within the furnace.

The tube assembly 775 comprises a tube 700 and a stack 701 of capillary tubes disposed substantially within the tube 700. The stack 701 may comprise capillary tubes that include a substantially hollow lumen as well as tubes that are partially or completely solid. A small portion 710 of the stack 701 may extend outside the tube 700 as shown in FIG. 7. The arrangement of the stack 701 of capillary tubes within the tube 700 will be described further below with reference to FIGS. 8A-8C. A pressurizing tube 704 may be coupled to the portion 710 of the stack 701 in order to form a substantially air-tight connection so that pressure can be applied to the capillaries. The pressurizing tube 704 may comprise a polymer such as, for example, polyimide, and the tube 704 may be adhesively coupled to the stack 701 with a high temperature epoxy.

In some embodiments, the end 703 of the tube 700 is tapered and made substantially air-tight. A corresponding taper (not shown in FIG. 7) is made at an end of the stack 701 of capillary tubes, so that the tapered ends of the stack 701 and the tube 700 mate after insertion of the stack 701 into the tube 700. In a preferred embodiment, the taper at the end of the stack 701 provides a substantially air-tight seal so that some or all of the capillary tubes may be pressurized.

FIG. 7 illustrates an initial phase of the preform fabrication process. The tube assembly 775 is held by the preform chuck 705, with the tapered end 703 of the tube 700 in the furnace 706. An appropriate pressure is applied through the pressurizing tube 704 to expand the capillary tubes located in the hot zone created by the heating elements 707. The pressure is selected to reduce or minimize expansion of the portion of the tube 700 that is in the furnace 706. In certain embodiments, one or more inert gases are used in the pressurization system, while in other embodiments, nitrogen, oxygen, and/or other gases can be used.

The temperature of the furnace 706 is controlled to allow a precise expansion of the capillary tubes in the stack 701. The preform chuck 705 then relatively slowly translates the tube assembly 775 through the hot zone of the furnace 706. The translation may be at a substantially constant speed to obtain a preform with a substantially long length and a substantially uniform cross-section.

Figure 8A:
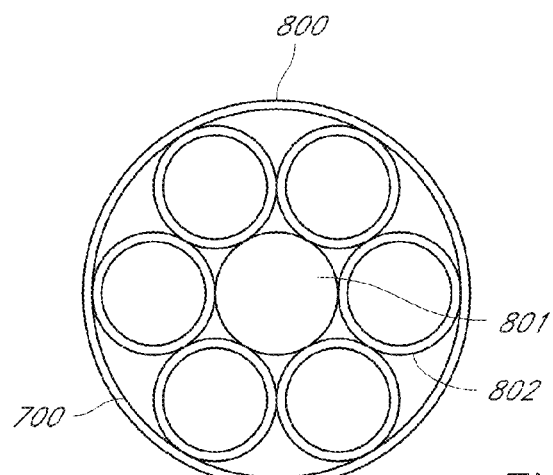
FIGS. 8A-8C are cross-section views schematically illustrating embodiments of preform assemblies used in a preform fabrication process.
Figure 8B:
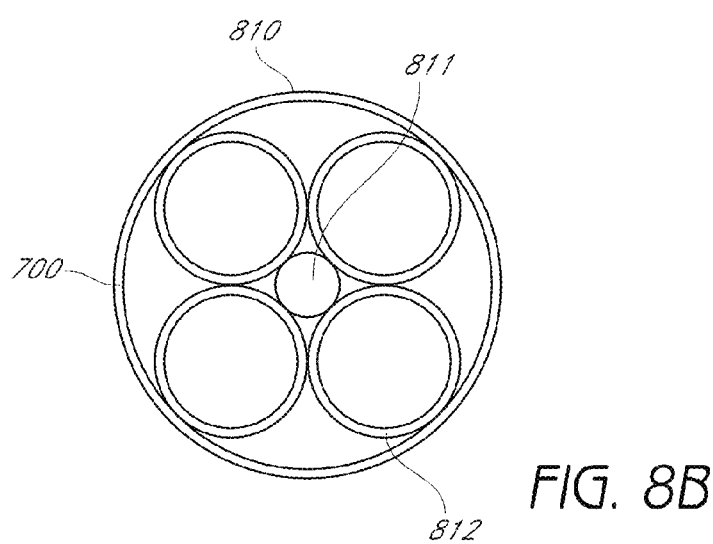
Figure 8C:
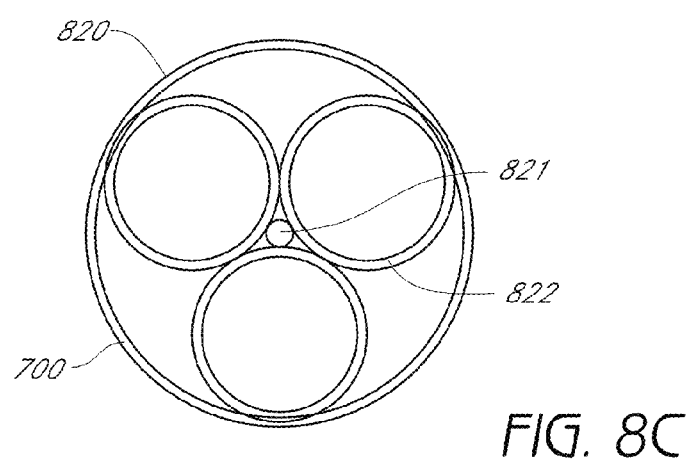

Tube assemblies 775 having various arrangements of the capillary stack 701 can be used in the preform fabrication apparatus 750. FIGS. 8A-8C schematically illustrate example cross-sectional arrangements of the capillary stack 710 within the tube 700. In FIG. 8A, a tube assembly 800 comprises a tube 700 including six capillary tubes 802 disposed around a central rod 801 inside the tube 700. The assembly 800 may be used for an ultra high numerical optical fiber comprising six webs (e.g., for the fibers 200 and 600). In FIG. 8B, an assembly 810 comprises a tube 700 including four capillary tubes 812 disposed around a central rod 811 inside the tube 700. The assembly 810 may be used for optical fibers comprising four webs. In FIG. 8C, the assembly 820 comprises a tube 700 including three capillary tubes 822 disposed around a central rod 821 inside tube 700. The assembly 820 may be used for an optical fiber comprising three webs. Assemblies having a smaller or larger number of tubes 802, 812, and 821 may be used. In some preferred embodiments, the central rod is substantially solid, and each of the capillary tubes comprises a substantially hollow lumen. In other embodiments, some or all of the capillary tubes may be solid, and one or more central rods may be used. Many variations are possible.

In the embodiments shown in FIGS. 8A-8C, the capillary tubes (802, 812, or 822) and the central rod (801, 811, or 821) are arranged to be substantially closely packed within the tube 700. A closely packed arrangement has advantages such as reducing or minimizing relative movement among the tubes and rods, reducing breakage of the tubes and rods, and keeping the central rod substantially centered within the tube 700. As can be seen from FIGS. 8A-8C, as the number of capillary tubes increases in these embodiments, the diameter of the central rod increases relative to the inside diameter of the tube 700 and the outside diameter of the capillaries.

In one example of the preform fabrication process, the apparatus 750 shown in FIG. 7 was used to heat and expand the tube assembly 800 shown in FIG. 8A. Prior to the heating and expansion process, the capillary tubes 802 and the central rod 801 had outside diameters of about 1.2 mm. Each capillary tube 802 had an inner diameter to outer diameter ratio of about 0.9. The tube 700 had an inner diameter of 3.63 mm and an outer diameter of 4.7 mm. Argon was used as the pressurizing gas in the apparatus 750, and the pressure was 2.05 pounds/square-inch (psi) higher within the capillary tubes 802. The pressure within the tube 700 remained at approximately ambient pressure. Accordingly, the differential pressure is 2.05 pounds/square-inch (psi). The pressure in the capillary tubes 802 is increased relative to the pressure in the tube 700 so that the capillary tubes 802 expand in size within the tube 700. The temperature of the furnace 706 was 1700° C. The preform chuck 705 moved the tube assembly 800 at a substantially uniform speed of about 4 mm/min through the furnace 706 to produce a first post-expansion preform assembly 900.

Figure 9:
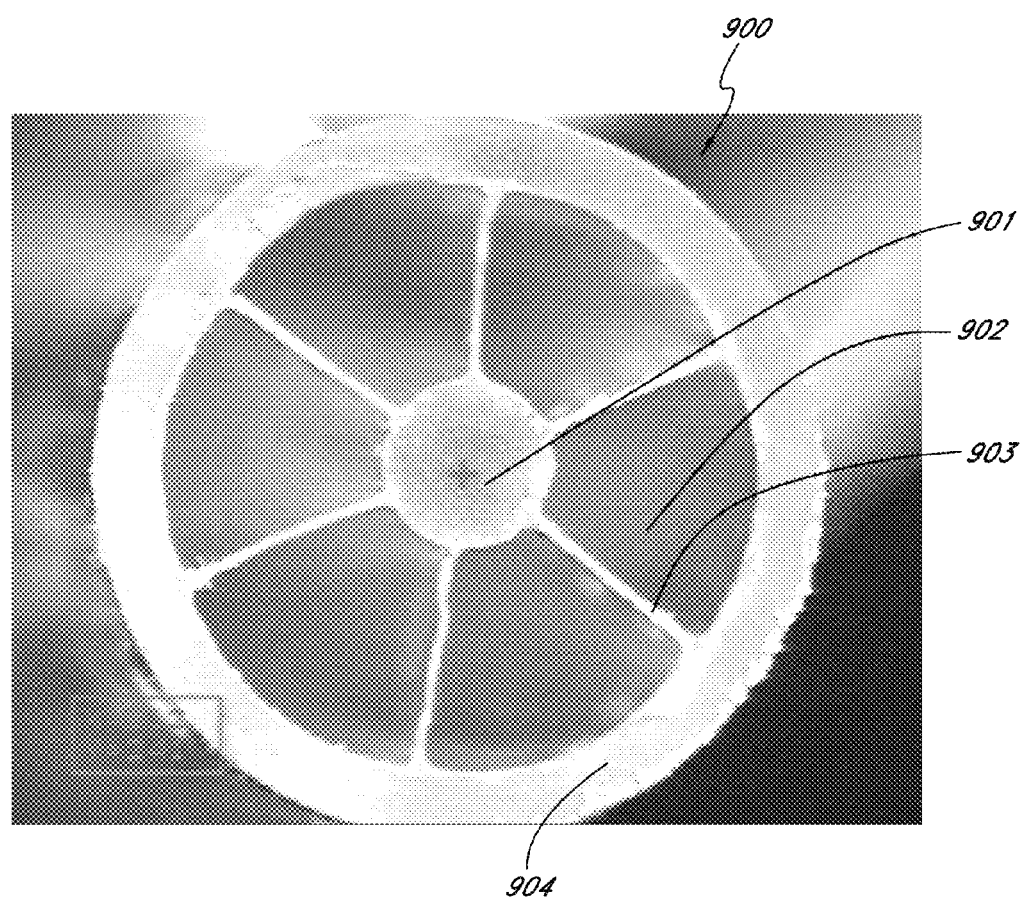
FIG. 9 is a cross-section view of a post-expansion assembly resulting from heating and expansion of the preform assembly shown in FIG. 8A in the preform fabrication apparatus of FIG. 7.

FIG. 9 is a cross-section view of the first post-expansion assembly 900 resulting from heating and expansion of the assembly 800. The first post-expansion assembly 900 comprises a core 901 that is surrounded by a first cladding 902. The first cladding 902 has six webs 903. The tube 700 has slightly expanded to form a second cladding 904.

In some embodiments of the fabrication method, the first post-expansion assembly 900 can be drawn into an ultra high numerical aperture fiber. In some of these methods, the first cladding 902 is pressurized while the fiber is drawn. In other embodiments, the first post-expansion assembly 900 is repeatedly processed an additional one, two, three, or more times in the preform apparatus 750 to produce a second (or third, fourth, etc.) post-expansion assembly. Some of these subsequent processing steps will be described below. When a post-expansion assembly has achieved characteristics desired for a particular application, the post-expansion assembly may be drawn into UHNAF.

Figure 10:
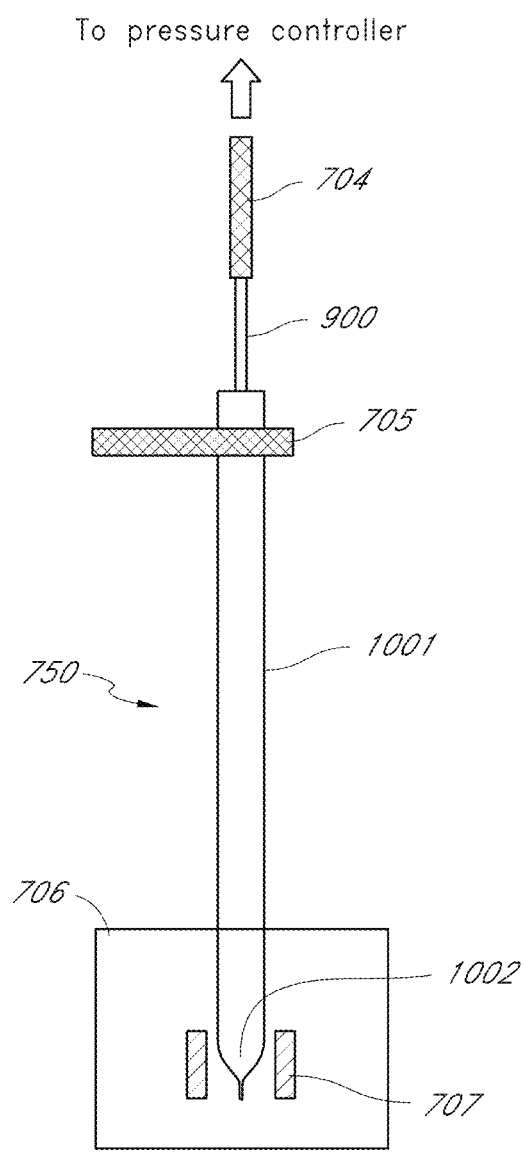
FIG. 10 schematically illustrates an optional heating and expansion step that may be applied to a post-expansion preform assembly to further increase the width of the first (air) cladding.

FIG. 10 schematically illustrates a subsequent, optional processing phase that may be applied to the first post-expansion preform assembly 900. In this phase, the expanded assembly 900 is disposed in a tube 1001 with a larger diameter. The tube 1001 is held by the preform chuck 705. A taper may be made to the bottom end of the assembly 900 to form a substantially air-tight seal before insertion into the tube 1001, which has a corresponding taper 1002 (see FIG. 10). The taper at the end of the expanded assembly 900 mates with and rests inside the taper 1002, advantageously allowing the assembly 900 to be partially supported by tube 1001.

The first expanded assembly 900 is connected to the pressurizing tube 704, where pressure can again be applied. While pressure is applied and the furnace 706 operates at an appropriate, controlled temperature, the assembly 900 is relatively slowly fed through the hot zone created by the heating element 707. During this phase, the first expanded assembly 900 further expands in the tube 1001 to form a second expanded assembly 1200.

Figure 12A:
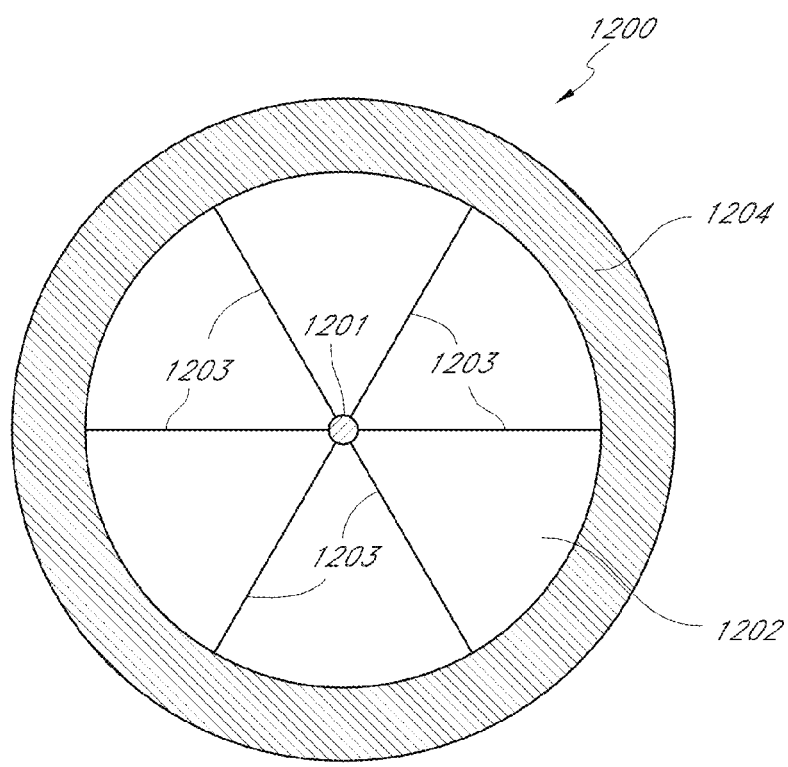
FIG. 12A is a cross-section view that schematically illustrates a second expanded assembly, which comprises a core, a first cladding, webs, and a second cladding wherein the first (air) cladding has been further increased in size using apparatus such as shown in FIG. 10.

FIG. 12A is a cross-section view that schematically illustrates the second expanded assembly 1200, which comprises a core 1201, a first cladding 1202, webs 1203, and a second cladding 1204. The second cladding 1204 has expanded further away from the core 1201 and the transverse dimension of the webs 1203 has been further reduced. The second heating and expansion phase can be repeated additional times as needed to further expand the dimension of the first cladding 1202. The preform assembly additionally and optionally can have its outer diameter reduced by drawing on a cane tower before repeating the second expansion step.

In an example of the second heating and expansion phase, the first expanded assembly 900 was inserted into the tube 1001, which had an inner diameter of 22.5 mm and outer diameter of 25 mm. The temperature of the furnace 706 was 1680° C. The preform chuck 705 translated the assembly 900 at a substantially uniform rate of 8 mm/min. The assembly 900 was pressurized to 19 psi.

Figure 11:
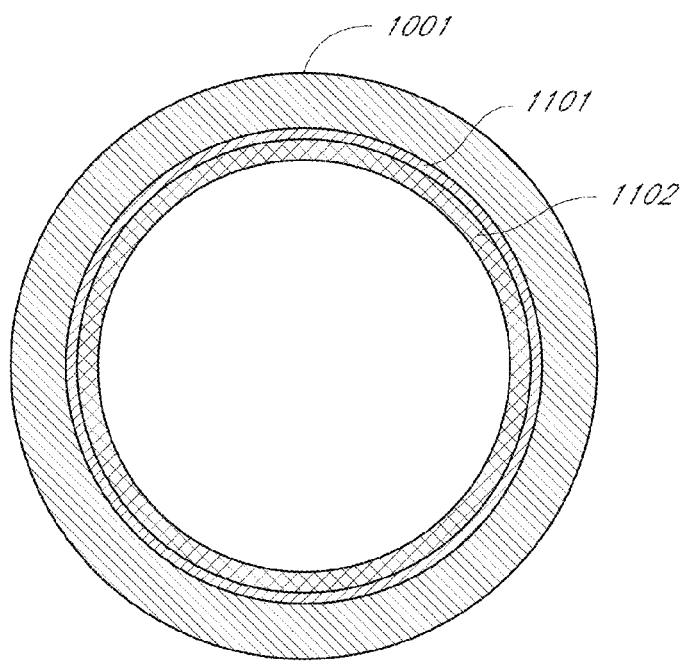
FIG. 11 is a cross-section view that schematically illustrates two additional layers formed substantially uniformly on the inside surface of the tube used in the preform apparatus of FIG. 10. These layers may be used to provide a UHNAF with additional claddings such as used in the taper shown in FIG. 6B.

Further, optional processing steps may be used to provide additional cladding layers. For example, to make a preform for the optical fiber 600 shown in FIG. 6A, one or more additional layers of materials can be formed on an inside surface of the tube 1001 before the first expanded assembly 900 is disposed therein. FIG. 11 is a cross-section view that schematically illustrates a relatively low refractive index layer 1101 and a slightly higher refractive index layer 1102 formed substantially uniformly on the inside surface of the tube 1001. In one method, these additional layers can be formed by placing the tube 1001 in a modified chemical vapor deposition system such that the layers 1101 and 1102 are deposited on the inner surface of the tube 1001. In some embodiments, the layer 1101 may be silica doped with boron or a combination of fluorine and phosphorus. The layer 1102 may be fused silica or fused silica doped with one of, or a mixture of, germanium, phosphorous, boron, and fluorine to achieve a refractive index slightly higher than that of the layer 1101. In some processes, the thickness of the layer 1102 (and/or the layer 1101) is controlled so that the modal field diameter of an optical mode in the core 610 of the transition 625 of the fiber 600 shown in FIG. 6B can be substantially matched to that of the conventional fiber 650, as described above. Although FIG. 11 shows two additional layers 1101 and 1102, in other embodiments of the fabrication method, one, three, four, five, or more layers may be formed. In some embodiments, no additional cladding layers are utilized, and this processing step may be omitted.

Figure 12B:
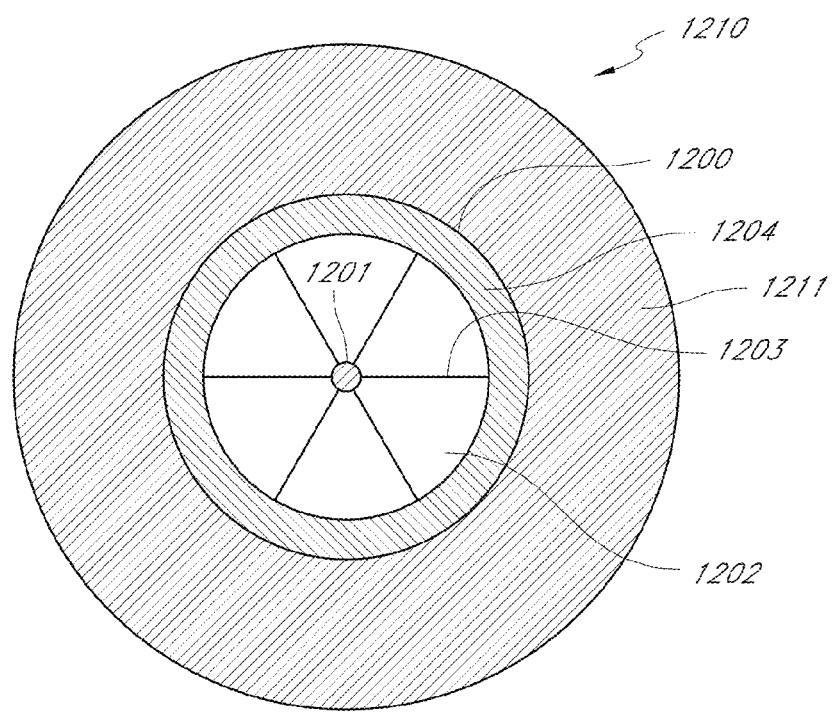
FIG. 12B is a cross-section view that schematically illustrates a third expanded assembly, which comprises a core, a first cladding, webs, and a second cladding inserted in a tube which may be subsequently drawn.
Figure 13A:
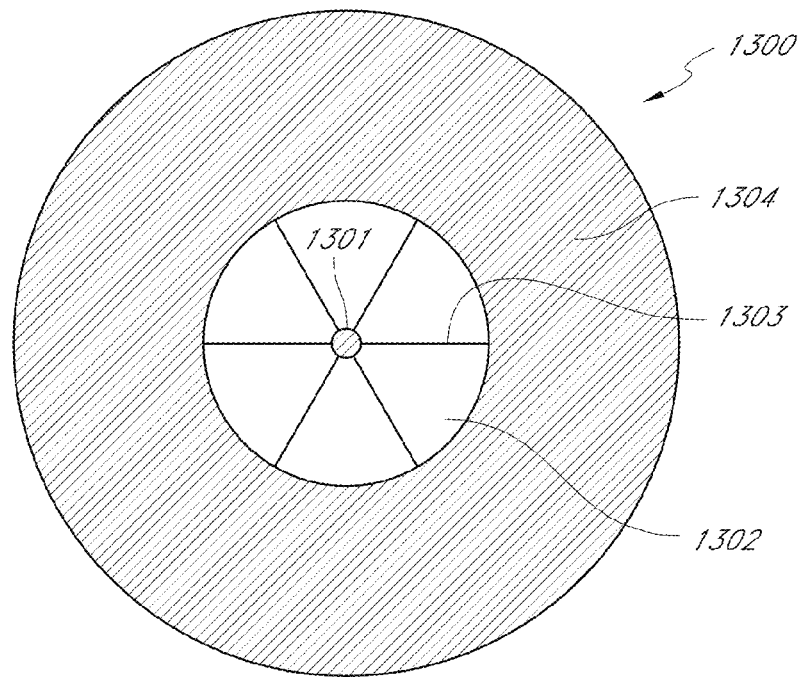
FIG. 13A is a cross-section view that schematically illustrates a fiber drawn from the third expanded assembly shown in FIG. 12B.
Figure 13B:
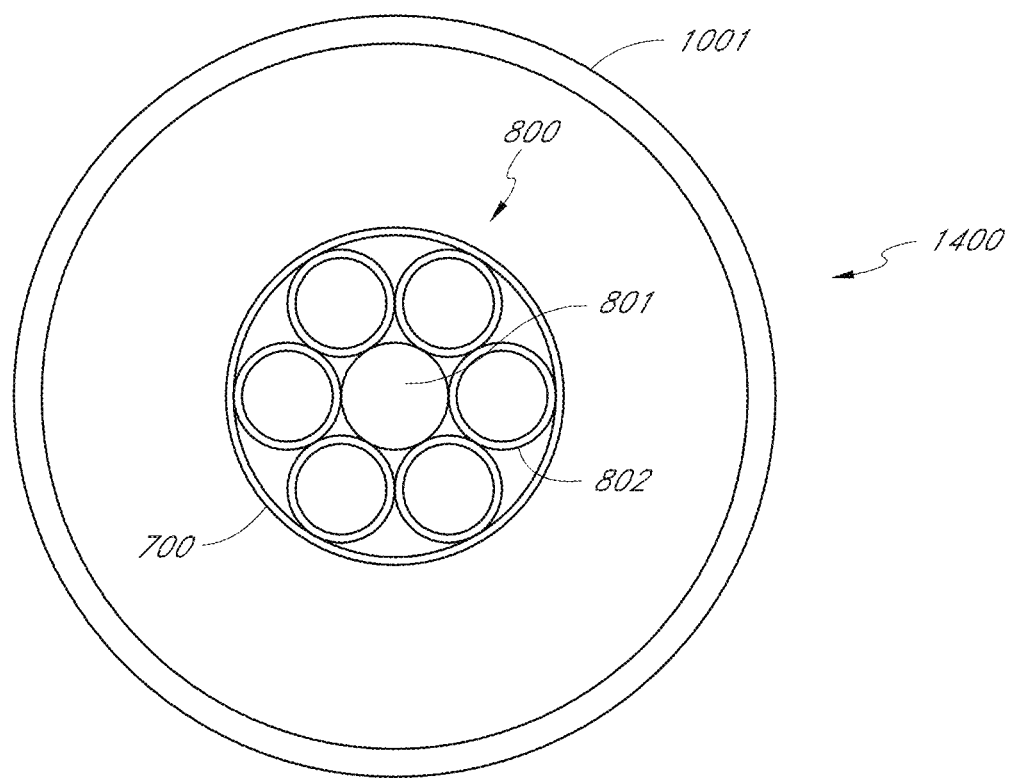
FIG. 13B is a cross-section view schematically illustrating an embodiment of a preform assembly that may be used in a preform fabrication process in which two heating and expansion steps are combined into a single processing step.

In a third phase of the preform fabrication process, the diameter of the second expanded assembly 1200 may be reduced on a caning tower. The assembly 1200 is then inserted into a tube 1211 to form a third assembly 1210 as illustrated in FIG. 12B. In some embodiments of the fabrication method, the third assembly 1210 is drawn into optical fibers. In some of these embodiments, the first cladding 1202 is pressurized while the fiber is drawn. FIG. 13A is a cross-section view that schematically illustrates a fiber 1300 resulting from this process. The fiber 1300 comprises a core 1301, a first cladding 1302, webs 1303, and a second cladding 1304.

The fiber 1300 can be configured to have an outer diameter approximately equal to that of standard telecommunication fibers in applications where the fiber 1300 is intended to be used with telecommunication fibers. The fiber 1300 can be fabricated to have other diameters. If further expansion of the preform is desired, the second expanded assembly 1200 can be inserted into a tube 1211 that has a larger inner diameter than the outer diameter of the second expanded assembly 1200.

In alternative embodiments of the preform fabrication method, some or all of the first and/or the second expansion phases (and repeats thereof) may be performed as a single process. In such embodiments, a preform assembly 1400 having a cross-section shown in FIG. 13B may be used in the expansion phase schematically illustrated in FIG. 10. In certain such embodiments, the capillaries 802 are pressurized while the assembly 1400 moves relatively slowly through the hot zone of the furnace 706. A skilled artisan will recognize that preform assemblies having cross-sections different than shown in FIG. 13B can be used as well.

In an alternative embodiment of a method for fabricating UHNAF preforms and fibers, vacuum and optionally pressure are used in one or more expansion phases. In one embodiment of the vacuum-assisted fabrication process, a preform assembly is drawn into a cane (see FIGS. 14A-14C) and then the cane is drawn into a fiber (see FIGS. 14D-14F).

Figure 14A:
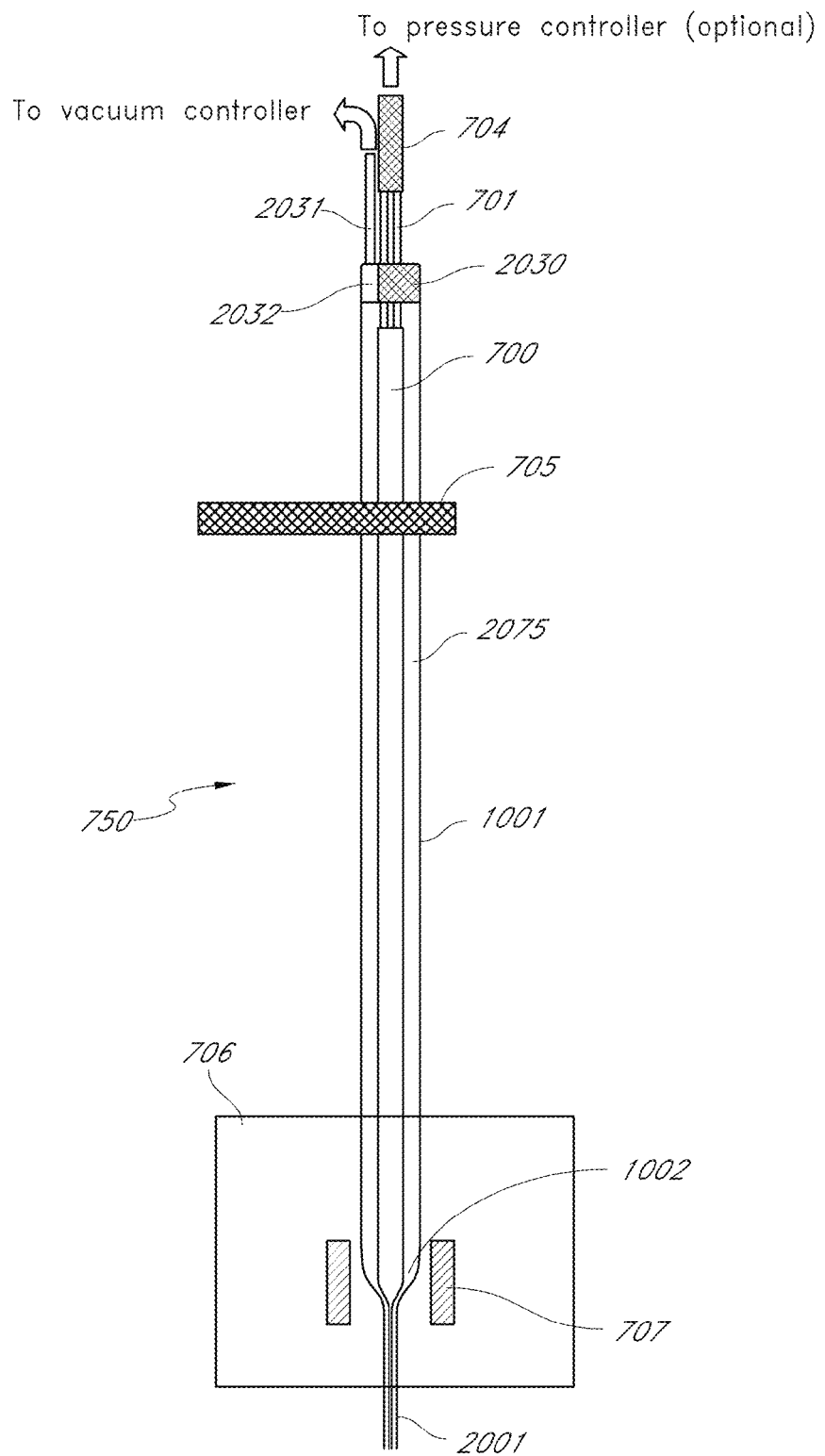
FIG. 14A schematically illustrates a portion of a preform fabrication apparatus used in fabricating a preform for a UHNAF using vacuum.

FIG. 14A schematically illustrates a portion of the preform fabrication apparatus 750 suitable for use with embodiments of the vacuum-assisted method. The stack 701 is inserted into the tube 700. In some embodiments, the stack 701 is longer than the tube 700, so a portion of the stack 701 is extends outside the tube 700 as shown in FIG. 14A. A taper is made at the other end, to substantially seal the stack 701 and tube 700. A taper 1002 is made at one end of a larger tube 1001. The stack 701 and the tube 700 are disposed in the tube 1001 to form assembly 2075. The tube 1001 may be longer than the tube 700 but shorter than the stack 701. A seal 2030 is placed at the open end of tube 1001. For example, the seal 2030 may be glued to tube 1001 by a high temperature epoxy to form a substantially air-tight seal. The seal 2030 may have a substantially central hole to allow the stack 701 to extend therethrough. The seal 2030 may also have an offset hole 2032 to connect to a vacuum tube 2031, which is used to depressurize the tube 700 and/or the tube 1001 as further described below. In some embodiments of the apparatus 750, a substantially air-tight seal is provided by gluing one or both of the vacuum tube 2031 and the stack 701 with high temperature epoxy. Optionally, the pressure tube 704 may be glued to the stack 701 and used to provide pressure to the capillary tubes 802 if desired (e.g., substantially as described with reference to the embodiments shown in FIGS. 7 and 10). The pressure tube 704 is not used in certain embodiments.

The seal 2030 may be made of a high temperature polymer such as, for example, polytetrafluorethylene (PTFE). In some embodiments, one or both of the vacuum tube 2031 and the optional pressure tube 704 may be flexible. The vacuum tube 2031 may be connected to a vacuum pump (such as a variable vacuum pump), and the optional pressure tube 704 may be connected to a pressure controller.

In one embodiment of the fabrication method, the tubes 700 and 1001 are depressurized through the vacuum tube 2031 to create at least a partial vacuum in the tubes 700 and 1001. The capillary tubes 802 in the stack 701 expand due to the pressure differential between the capillaries 802 and the tube 700. Optionally, the capillaries can be further pressurized through the pressure tube 704 to provide an increased pressure differential. In some embodiments, expansion of the capillary tubes 802 causes expansion of the tube 700 within the larger tube 1001. In certain embodiments, the larger tube 1001 does not expand significantly during the fabrication process.

As schematically shown in FIG. 14A, the assembly 2075 is held by the chuck 705 on the preform apparatus 750, which includes the furnace 706 with a hot zone provided by the heating elements 707. The assembly 2075 is translated relative to the hot zone such that a cane 2001 is drawn from the apparatus 750. One possible advantage of using the vacuum method described with reference to FIG. 14A is that the fabrication process is relatively easy to control. Another possible advantage is that expansion of the tube 1001 can be reduced or minimized during the process.

Figure 14B:
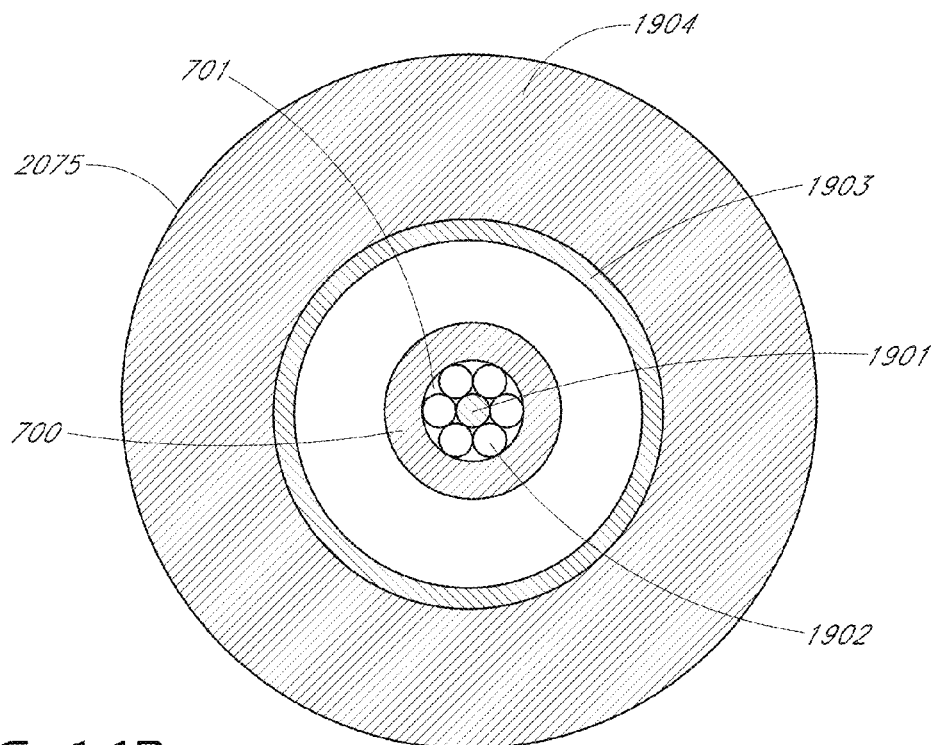
FIG. 14B schematically illustrates a cross-section of a preform assembly used for the caning stage of the vacuum-assisted expansion process shown in FIG. 14A.

FIG. 14B schematically illustrates an example cross-section of the assembly 2075. In this embodiment, the stack 701 comprises a germanium-doped rod 1901 with a graded refractive index, a peak numerical aperture of 0.25 if included in a fused silica cladding, and a diameter of 1.19 mm. The rod 1901 is surrounded by six capillary tubes 1902, each having a diameter of 1.19 mm and an inner-diameter-to-outer-diameter ratio of 0.9. Although six capillary tubes 1902 are used in the embodiment shown in FIG. 14B, fewer or greater number of tubes 1902 are used in various other embodiments. Also, in some embodiments, the tubes 1902 are not substantially similar to each other and may have different diameters and/or inner-diameter-to-outer-diameter ratios or other properties. In one embodiment, the tube 700 has an inner diameter of 3.6 mm and an outer diameter of 7.2 mm. The tube 700 is disposed within the larger tube 1904, which has an inner diameter of 12.5 mm and an outer diameter of 25 mm, although other diameters are used in other embodiments. In some embodiments, the inner surface of the tube 1904 optionally may include one or more layers coated or deposited thereon, which may be used to provide additional claddings for the UHNAF. For example, in one embodiment, the tube 1904 comprises a fluorine and phosphorus doped layer 1903, which has a thickness of about 0.7 mm. The layer 1903 may be deposited using a modified chemical vapor deposition system or by some other suitable technique. In other embodiments, the layer 1903 is not doped or is doped with different substances. The layer 1903 may have a different thickness in other embodiments or not be used at all.

Figure 14C:
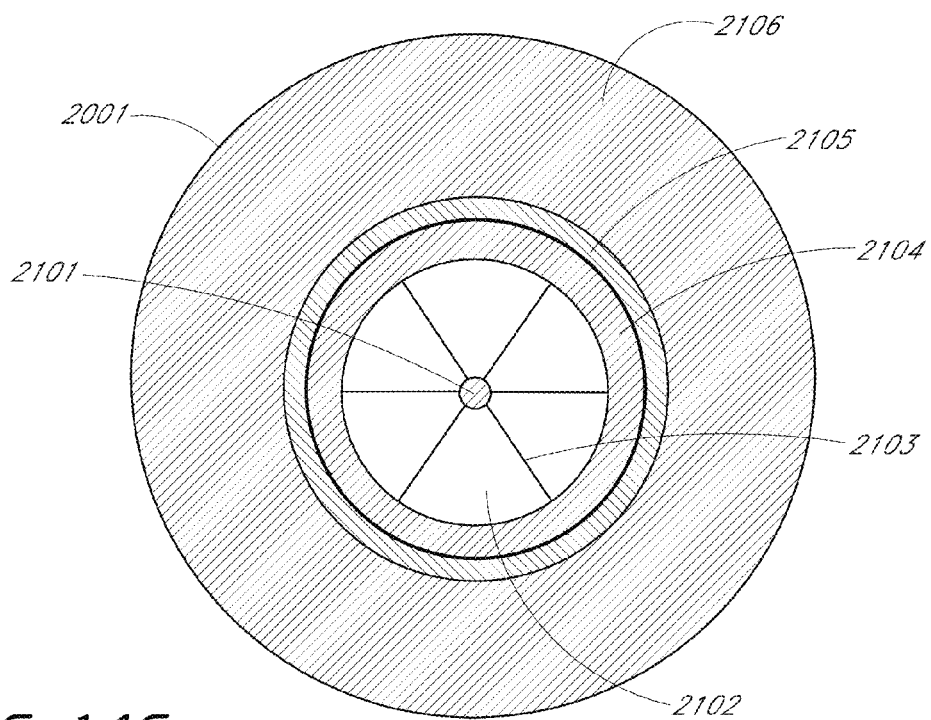
FIG. 14C schematically illustrates a cross-section of the cane drawn during the caning stage of the vacuum-assisted expansion process.

FIG. 14C schematically illustrates an example of the cross-section of the cane 2001, which can be drawn from the apparatus 750 using the preform shown in FIG. 14B. In this embodiment, the cane 2001 comprises a core 2101, first cladding 2102, webs 2103, first additional cladding 2104, second additional cladding 2105, and outer cladding 2106. Any of these layers may have a higher or lower refractive index than that of the core in certain embodiments. Accordingly, layers referred to herein as cladding layers may instead be substituted with layers having a higher refractive index, for example, than the core and thus not operate as a optical cladding.

Figure 14D:
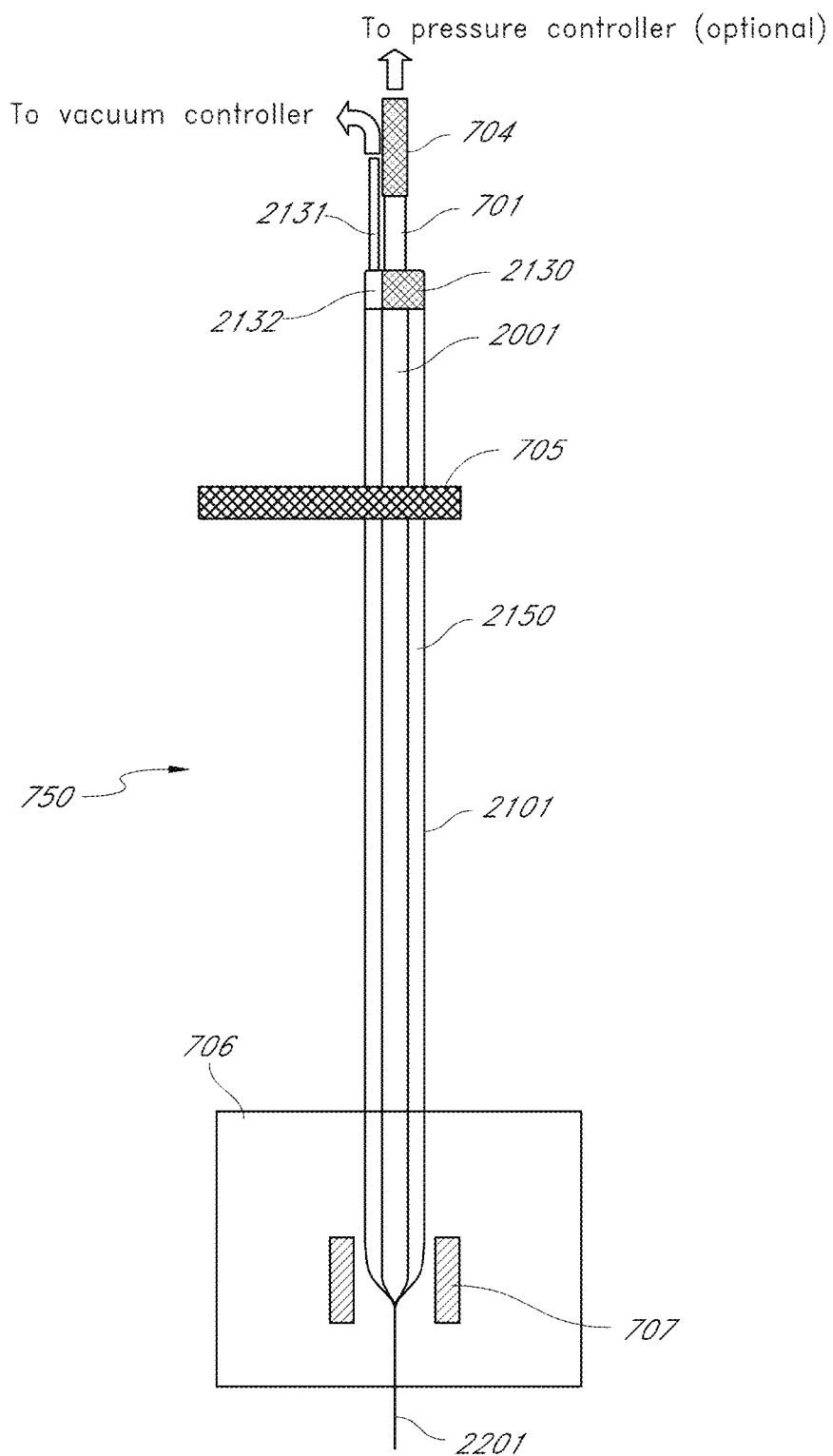
FIG. 14D schematically illustrates a portion of a fiber drawing apparatus used in fabricating a UHNAF using vacuum.

After the cane 2001 is fabricated, the cane 2001 may be further processed into a UHNAF. FIG. 14D schematically illustrates an embodiment of an apparatus 750 for drawing a fiber 2201 using vacuum-assisted techniques. An assembly 2150 comprises the cane 2001 and a tube 2101. The cane 2001 may be substantially similar to the cane 2001 shown in FIG. 14C. In some embodiments, the cane 2001 is fabricated using apparatus and methods similar to those described with reference to FIGS. 14A-14C. The cane 2001 is inserted into a tube 2101. The tube 2101 may be shorter than the cane 2001 so that a portion of the cane 2001 extends outside of the tube 2101. A seal 2130 is provided on one end of the tube 2101, for example, by gluing a high temperature epoxy to the end of the tube 2101 to form a substantially air-tight seal. The seal 2130 may include a substantially central hole that permits an end of the cane 2001 to extend beyond the tube 2101 and to connect to an optional pressure controller for pressurizing the cane 2001. The seal 2130 may include an offset hole 2132, which allows connection to a vacuum tube 2131, for reducing the pressure within the tube 2101. In some embodiments, one or both of the cane 2001 and the tube 2131 are glued by a high temperature epoxy to form a substantially air-tight seal. An optional pressure connection tube 704 may be attached to cane 2001 (e.g., via high-temperature epoxy) and used to optionally pressurize the cane 2001. The pressure tube 704 is not used in some embodiments.

The assembly 2150 is held by the chuck 705 on the fabrication apparatus 750, which includes the furnace 706 having a hot zone generated with the heating elements 707. In a preferred embodiment, when vacuum is applied via the vacuum tube 2131 to reduce the pressure within the tube 2101, the cane 2001 expands to substantially fill the space between the tube 2101 and the cane 2001. The assembly 2150 is translated relative to the hot zone within the furnace 706, and a fiber 2201 is drawn from the portion of the assembly 2150 heated within the hot zone. In some embodiments, vacuum is applied to the tube 2101 and the cane 2001 is not pressurized, whereas in other embodiments, vacuum is applied to the tube 2101 and the cane is pressurized. Accordingly, by suitably adjusting the relative pressures in the tube 2101 and/or the cane 2001, the fiber drawing process advantageously can be precisely controlled.

Figure 14E:
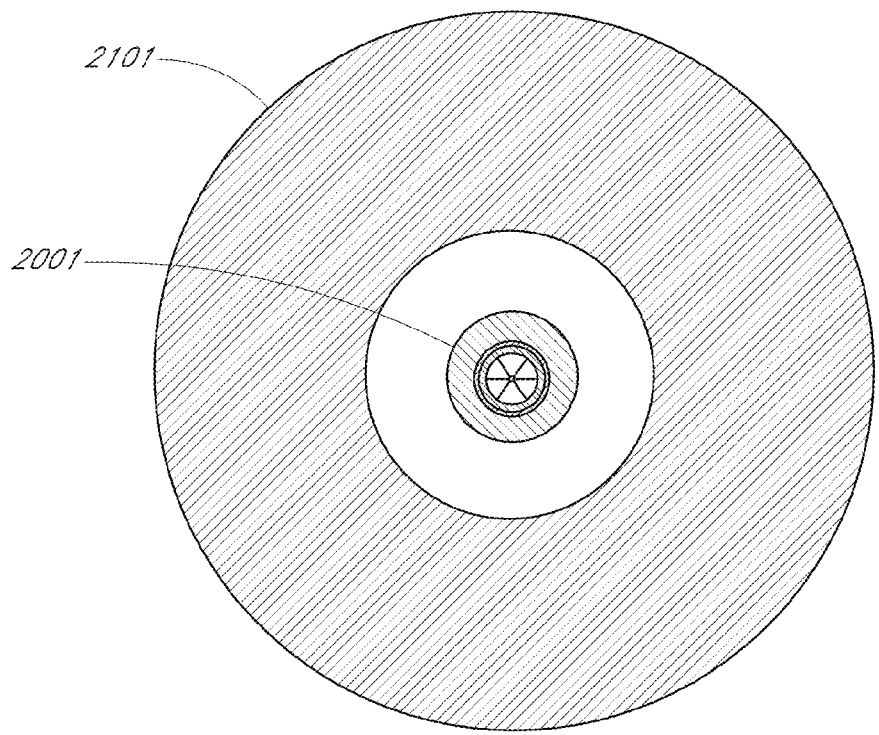
FIG. 14E schematically illustrates a cross-section of an assembly used in the drawing apparatus depicted in FIG. 4D.
Figure 14F:
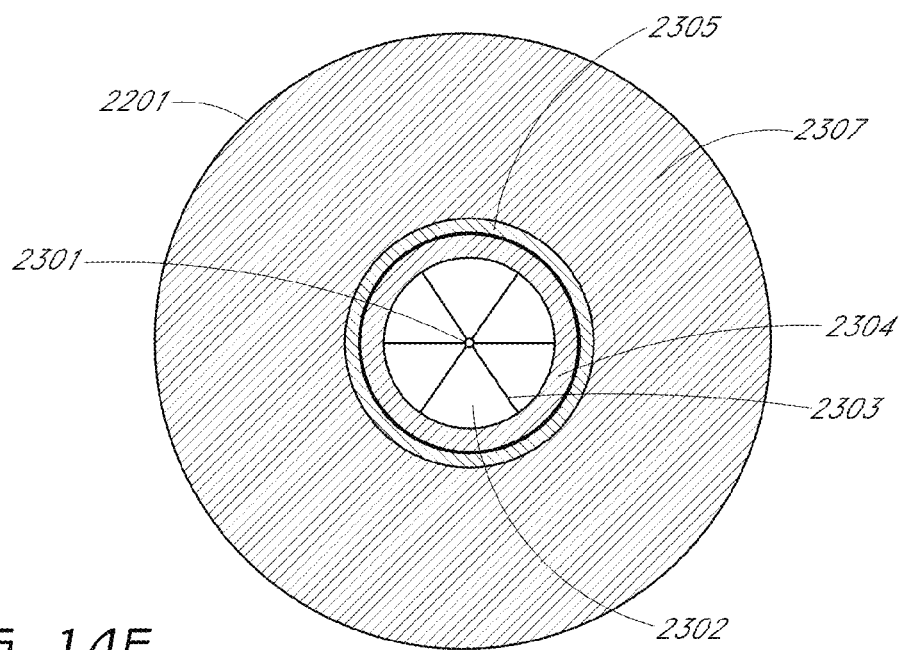
FIG. 14F schematically illustrates a cross-section of a fiber drawn from the assembly depicted in FIG. 14E.

FIG. 14E schematically shows an example cross-section of the assembly 2150 that may be used in the apparatus 750 of FIG. 14D. In this embodiment, the cane 2001 has an outer diameter of 2.8 mm. Similarly as shown in FIG. 14C, the cane 2001 may comprise a core, first cladding, webs, additional (optional) claddings, and an outer cladding. In the embodiment shown in FIG. 14E, the tube 2101 has an outer diameter of 16.7 mm and an inner diameter of 3.7 mm. FIG. 14F schematically illustrates an example cross-section of the fiber 2201 drawn using the assembly 2150 shown in FIG. 14E. In one example of the vacuum fiber drawing method, the fiber 2201 has an outer diameter of about 125 µm. The fiber 2201 comprises a core 2301 having a diameter of about 1 µm and a first cladding 2302 having a diameter of about 20 µm. The fiber 2201 also comprises webs 2303, first additional cladding 2304, second additional cladding 2305, and outer cladding 2307.

Certain preferred embodiments of preform, cane, and fiber fabrication methods have been described above with reference to the figures. It is to be understood that these embodiments are nonlimiting examples of possible methods for fabricating an ultra high numerical optical fiber. For example, the phases and techniques described herein may be performed different numbers of times and in different orders in order to fabricate a preform having certain desired properties. Additional processing steps (such as, e.g., the chemical vapor deposition described above) may be used. In some examples of the method, some of the above-described phases are eliminated and/or combined with other processing phases. Apparatus different from the apparatus 750 shown in FIGS. 7, 10, 14A, and 14D may be used. Many variations are contemplated.

Embodiments of ultra high numerical aperture fiber can be used in a wide range of systems and applications. Examples of some of these systems and applications are further described below. It is to be understood that these examples are not intended to limit the range of systems and applications in which UHNAF may be used, and are presented herein for illustrative purposes only.

Many systems, including, for example, telecommunications systems and pulse amplification systems, operate based at least in part on nonlinear effects. One example is a system based on mid-span spectral inversion, which flips the spectrum of optical pulses around its center so that dispersion in the second part of the transmission can be used to compress the broadened pulses. Another example is a pulse regeneration scheme based on a nonlinear device, which attenuates preferentially low amplitude noise. A further example is an ultra-broad-band source based on super-continuum generation in optical fibers. Each of these systems (as well as others) may benefit from the use of a low-loss UHNAF having a small modal field diameter (MFD). The small MFD may lead to substantially increased nonlinearity. Use of such a UHNAF may also reduce a nonlinear device's threshold, insertion loss, and physical size.

Figure 15:
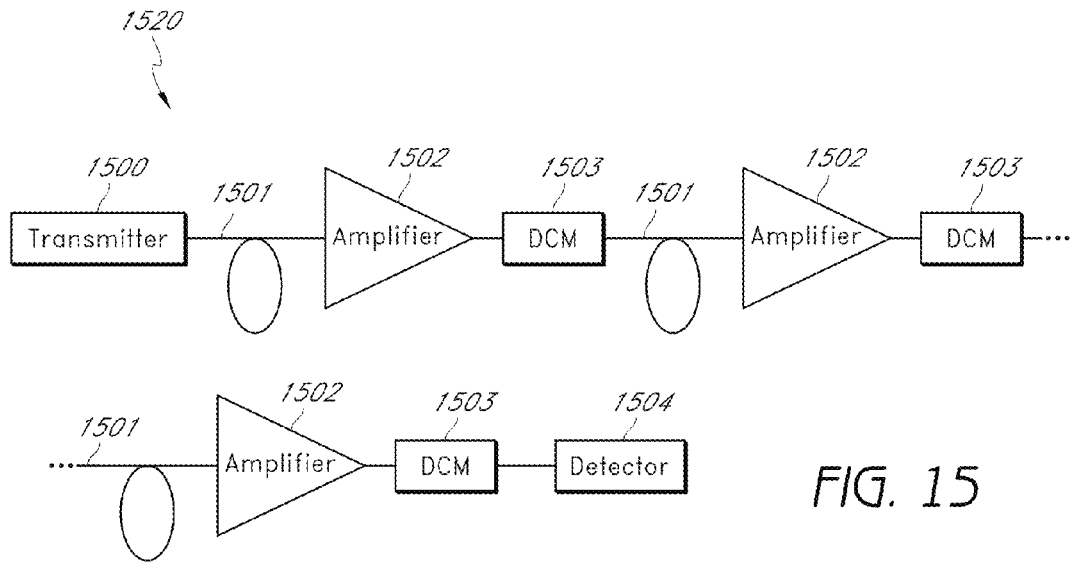
FIG. 15 schematically illustrates a multi-span wavelength-division multiplexed (WDM) system, including dispersion compensation modules (DCM) comprising UHNAF.

In another example, an embodiment of a multi-stage telecommunication system 1520 is schematically illustrated in FIG. 15. The system 1520 includes a transmitter 1500, one or more fiber spans 1501, one or more amplifiers 1502, one or more dispersion compensation modules (DCMs) 1503, and a detector 1504. Any of the DCMs 1503 may comprise one or more coils or lengths of UHNAF (such as, e.g., the UHNAF 200 and/or 600 shown in FIGS. 2 and 6A). As described above, the reduced core size and mode field area in the fibers described herein can provide increased dispersion, for example, dispersion 3 or 4 times the magnitude of material dispersion. Accordingly, in some embodiments, the DCM 1503 comprises a single coil of UHNAF. In certain embodiments, the DCM 1503 comprises two (or more) separate coils of fiber, with at least one coil comprising UHNAF. In certain such embodiments, one coil can be optimized for dispersion compensation and another coil can be optimized for dispersion slope compensation for a single span of the transmission optical fiber. In one embodiment, the coil comprising UHNAF is used for dispersion slope compensation.

In a fiber chirped pulse amplification (FCPA) system, short optical pulses are stretched into much longer pulses before being amplified. The amplified optical pulses are then compressed back to their original pulse width. This reduces peak intensity in the amplifier and avoids nonlinear limit in the amplifier. In some FCPA systems, the stretching ratio is limited by a lack of dispersion slope compensation for the third-order dispersion in the compressor.

Therefore, it may be desirable to provide precise third-order dispersion control in the stretcher to pre-compensate for third-order dispersion of the compressor. An FCPA system comprising such a stretcher can potentially allow two orders of magnitude increase in the stretching ratio, which may translate into two orders of magnitude more pulse energy from the FCPA system. Details of using photonic crystal fibers for dispersion management in mode-locked fiber lasers and FCPA systems are addressed in references such as U.S. Pat. No. 7,113,327 (IM-99), U.S. Patent Publication No. 2005-0041702 (IM-105), US Patent Publication No. 2004-0213302 (IM106); U.S. Patent Publication No. 2005-0226278 (IM-108), U.S. Patent Publication No. 2004-0263950 (IM-100), U.S. Patent Publication No. 2005-0105865 (IM-114), and U.S. Patent Publication No. 2005-0111500 (IM-125), each of which is incorporated by reference herein in its entirety.

Figure 16:
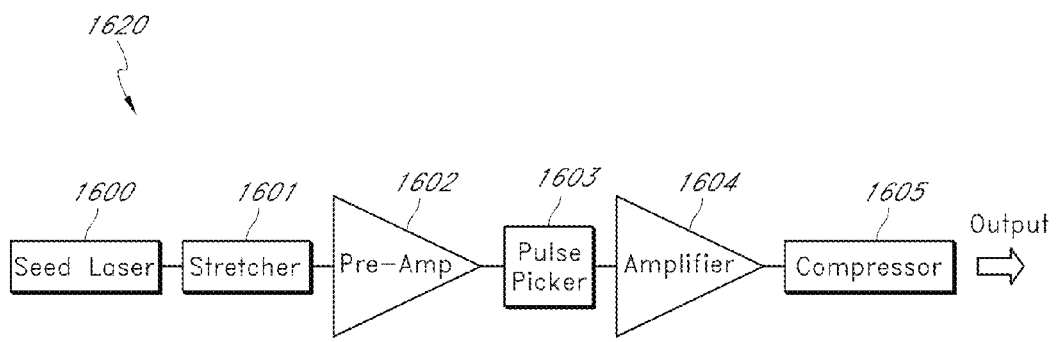
FIG. 16 schematically illustrates a fiber chirped pulse amplification (FCPA) system, which includes a stretcher comprising UHNAF.

FIG. 16 schematically illustrates an embodiment of an FCPA system 1620 that advantageously may utilize UHNAF. The system 1620 includes a seed laser 1600, a stretcher 1601, a pre-amplifier 1602, a pulse picker 1603, a power amplifier 1604, and a compressor 1605. The stretcher 1602 may comprise UHNAF such as, for example, UHNAF 200 or 600 (see, FIGS. 2 and 6A). In some embodiments of the stretcher 1602, a single coil of UHNAF is used. In other embodiments, two (or more) separate coils of fiber are used, with at least one coil comprising UHNAF. For example, one coil may be optimized for dispersion compensation, and the other coil optimized for dispersion slope compensation for the compressor 1605 used in the FCPA system 1620. In one embodiment, the coil comprising UHNAF is used for dispersion slope compensation.

Figure 17:
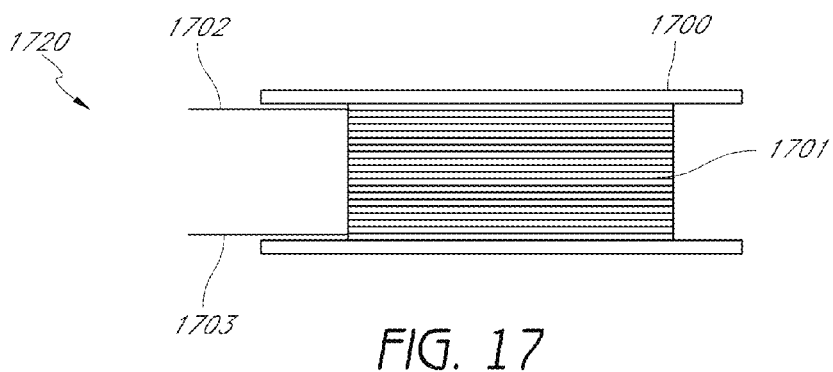
FIG. 17 schematically illustrates a spool of UHNAF.

An advantage of certain embodiments of UHNAF is that the fiber may have very low loss, which allows a long length of the UHNAF to be used in certain implementations without significant optical losses. An additional advantage of certain embodiments is that the UHNAF can be bent into a coil having a small bend radius, which enables a small package to be used for the UHNAF. An embodiment of a compact coil 1720 of UHNAF is schematically illustrated in FIG. 17. The coil 1720 includes a compact spool 1700, a coil of UHNAF 1701 having an input end 1702 and an output end 1703. This small coil 1720 can be utilized as a component of a DCM, such as the DCM 1503 described with reference to FIG. 15. Certain embodiments of UHNAF can be fabricated to have a reasonably small modal field diameter and consequently reasonably high nonlinearity. In one embodiment, a highly nonlinear fiber (HNLF) comprises the compact coil 1720 shown in FIG. 17. This embodiment of an HNLF advantageously can be used as a component in devices based on nonlinear effects in order, for example, to lower the device threshold and to reduce the device physical size.

Embodiments of UHNAF can be configured to provide strong optical guiding, because of the high NA provided by UHNAF compared to conventional fiber. Accordingly, certain embodiments of UHNAF can be bent around a reasonably sharp corner without suffering significant optical losses. Certain such UHNAF embodiments are thus beneficial when used in applications such as, for example, providing high capacity network data connections in homes and offices (e.g., wiring optical fiber circuits around a home or office in a "fiber to the home" (FTTH) implementation).

Optical fibers are used in many types of sensors. For example, sensors based on optical fibers can be used to measure the composition of gas and/or liquid. Some of these sensors utilize the interaction of the evanescent field of an optical mode propagating in the optical fiber with the gas or liquid to be measured. An optical mode in an optical fiber with a very small core, for example, comparable to or smaller than the wavelength of the propagating light, generally has a substantial part of its optical energy outside the core, e.g., the optical energy has a long interaction length. If such a small-core fiber is surrounded by a gas or liquid material, optical energy outside the core can interact with the material and, when detected, provide information about the material. For example, in some implementations, the long interaction length of the optical energy in the fiber is used for detecting trace levels of chemicals in the material which may, for example, be air.

Figure 18A:
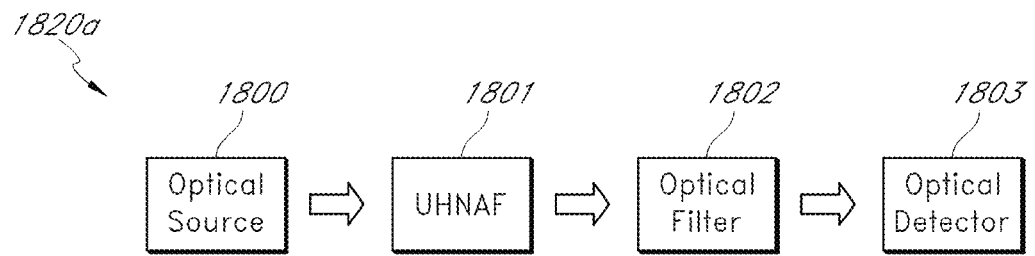
FIGS. 18A and 18B schematically illustrate embodiments of optical fiber sensor systems comprising UHNAF.
Figure 18B:
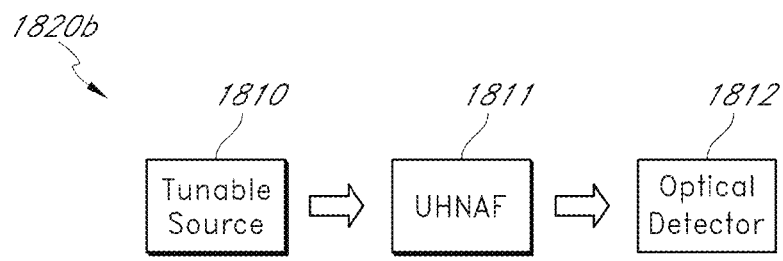

Accordingly, some embodiments of the UHNAF disclosed herein can be configured with a small core so that a substantial portion of the guided optical energy propagates in the first cladding (e.g., first cladding 202 or 602 in FIGS. 2 and 6A). Such UHNAF embodiments can advantageously be used in a sensor because of their reasonably long optical interaction length. FIGS. 18A and 18B schematically illustrate two example sensor systems 1820a and 1820b, respectively. The sensor system 1820a includes a broad band optical source 1800, a length of UHNAF 1801, an optical filter 1802, and an optical detector 1803. In use, a gas or liquid medium is introduced into the first cladding region of the UHNAF 1801, where the medium interacts with optical energy propagating over the length of the optical fiber 1801. An optical absorption spectrum can be measured by the detector 1803 (e.g., in the passband of the filter 1802, which may be tunable in wavelength) and can be used to detect and quantify concentrations of species in the medium. Embodiments of the sensor system 1820a beneficially can achieve high sensitivity because of the long interaction of the UHNAF 1801. The sensor system 1820b schematically illustrated in FIG. 18B includes a wavelength-tunable light source 1810, a length of UHNAF 1811, and an optical detector 1812. The sensor system 1820b can be used to measure an absorption spectrum of a gas or liquid medium introduced into the first cladding region of the UHNAF 1811. Embodiments of UHNAF may be used in other types of sensors as well.

A wide variety of variations of UHNAF and methods of fabrication thereof are possible. Components and features may be added, removed, or rearranged as different configurations are possible. Different materials may also be used. Additionally, processing steps may be added, removed, or reordered. For example, one or more refractive index raising dopants (e.g. germanium and/or phosphorus) can be added to the core (e.g., the core 201 or 601) to further raise the numerical aperture of a UHNAF. Doping silica glass with germanium has the added benefit of increasing nonlinear coefficients of the glass, which can be advantageous for highly nonlinear fibers (such as those using the compact coil 1720 discussed with reference to FIG. 17).

Additionally, a birefringent optical fiber can be fabricated by introducing ellipticity to the core of the UHNAF. Due to the large numerical aperture of the UHNAF, a reasonably large amount of birefringence can be achieved in a fiber having a core with a relatively small amount of ellipticity. Polarizing optical fiber, in which a single polarization mode is supported, can also be fabricated due to the relatively large birefringence possible in the ultra high numerical aperture fibers.

Embodiments of the UHNAF described herein may be used in optical cables for transmitting optical signals between two or more points. Optical cables may include one or more optical fibers (or one or more bundles of optical fibers) that are surrounded by one or more protective layers. For example, the protective layers may include a polymer buffer and/or a jacket or protective sheath. Optical cables comprising UHNAF can be used in a wide range of applications including, for example, telecommunications, networking, etc.

The above description of certain preferred embodiments has been given by way of example and is not intended to be limiting. Additionally, although certain advantages have been described, not all such advantages need be achieved in each embodiment. For example, one advantage or group of advantages may be achieved or optimized in a particular UHNAF embodiment, without necessarily achieving or optimizing other possible advantages. From the disclosure given, those skilled in the art will not only understand the present invention and its attendant advantages, but will also find apparent various equivalents, changes, and modifications to the structures and methods disclosed. It is sought, therefore, to cover all such changes and modifications as fall within the spirit and scope of the following claims and equivalents thereof.

What is claimed is:

1. An optical fiber capable of propagating light having a wavelength, the fiber comprising:
   a core;
   an air cladding surrounding the core, the air cladding comprising an air gap having a width;
   an outer layer surrounding the air cladding;
   at least one additional layer disposed between said air cladding and said outer layer, wherein said at least one additional layer comprises:
      (a) a first layer having an index of refraction the same as or lower than an index of refraction of said core and
      (b) a second layer having an index of refraction lower than the index of refraction of said first layer; and
   a plurality of webs mechanically coupling the core and the outer layer such that said air gap is disposed therebetween,
   wherein the fiber is configured to have a numerical aperture greater than about 0.8, and
   wherein the optical fiber is arranged as a highly non-linear fiber (HNLF), wherein the core diameter is sufficiently small to provide sufficient nonlinearity for super-continuum generation.

2. The optical fiber of claim 1, wherein a ratio of the width of the air gap to the diameter of the core is greater than about 2 and less than about 15.

3. The optical fiber of claim 1, wherein said at least one layer further comprises at least one cladding layer having an index of refraction higher than an index of refraction of said core.

4. The optical fiber of claim 1, wherein said optical fiber further comprises a portion wherein said gap width decreases monotonically along said portion such that the mode field diameter monotonically increases in width along said portion.

5. The optical fiber of claim 4, wherein said gap width in said portion decreases down to zero.

6. The optical fiber of claim 4, wherein said portion of the optical fiber is spliced to a second optical fiber not comprising an air cladding.

7. The optical fiber of claim 6, wherein the mode field diameter of the optical fiber at the splice is approximately equal to a mode field diameter of the second optical fiber at the splice.

8. The optical fiber of claim 6, wherein a diameter of the optical fiber at the splice is approximately equal to a diameter of the second optical fiber at the splice.

9. The optical fiber of claim 1, wherein the optical fiber has a portion where the gap width decreases down to zero, and the optical fiber is coupled to another optical fiber at a location where the gap width is zero.

10. The optical fiber of claim 1, wherein the fiber comprises a mode expansion taper having a first region where the gap width decreases monotonically and a second region where the gap width increases monotonically.

11. The optical fiber of claim 1, wherein at least part of the core is doped with one or more of germanium, phosphorous, aluminum, titanium, and tin.

12. The optical fiber of claim 1, wherein the core diameter is less than about 3 micrometers.

13. The optical fiber of claim 1, wherein the core comprises silica doped with germanium to increase nonlinearity of the fiber.

14. The optical fiber of claim 1, wherein each of the webs has a transverse thickness less than about one-tenth the wavelength.

15. The optical fiber of claim 1, wherein each of the webs has a transverse thickness less than about 150 nm.

16. The optical fiber of claim 1, wherein the numerical aperture is greater than about 0.9.

17. The optical fiber of claim 1, wherein the core has sufficient ellipticity to be polarization maintaining.

18. The optical fiber of claim 1, wherein a V-value of the fiber is less than 2.3, thereby providing for single mode operation and high dispersion.

19. The optical fiber of claim 1, wherein the fiber is configured to have a negative dispersion.

20. The optical fiber of claim 19, wherein the magnitude of the dispersion is greater than about 300 ps/nm/km.

21. The optical fiber of claim 1, wherein the fiber has a loss less than about 10 dB/km.

22. A nonlinear optical device comprising the optical fiber of claim 1.

23. A fiber chirped pulse amplification system comprising the optical fiber of claim 1.

24. A coil comprising the optical fiber of claim 1.

25. The coil of claim 24, wherein the coil has a bend diameter less than about 5 cm.

26. An ultra-broad-band source based on super-continuum generation, the ultra-broad-band source comprising the optical fiber of claim 1.

27. The optical fiber of claim 1, wherein the core diameter is smaller than the wavelength.

28. The optical fiber of claim 1, wherein the core diameter is in a range from about ¼ the wavelength to about 5 times the wavelength.

29. The optical fiber of claim 1, wherein each of the webs has a transverse thickness less than about 100 nm.

30. The optical fiber of claim 1, wherein the optical fiber is configured such that when the wavelength is greater than about 1.3 times the core diameter, the optical fiber provides negative dispersion at the wavelength.

31. The optical fiber of claim 1, wherein the optical fiber is configured such that when the wavelength is greater than about 1.3 times the core diameter, the optical fiber provides single mode operation at the wavelength.

* * * * *